US008121051B2

(12) United States Patent
McGee et al.

(10) Patent No.: US 8,121,051 B2
(45) Date of Patent: Feb. 21, 2012

(54) NETWORK RESOURCE TEAMING ON A PER VIRTUAL NETWORK BASIS

(75) Inventors: Michael Sean McGee, Round Rock, TX (US); James R. Walker, Austin, TX (US); Mark C Stratton, Georgetown, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 844 days.

(21) Appl. No.: 11/711,260

(22) Filed: Feb. 26, 2007

(65) Prior Publication Data

US 2008/0205402 A1 Aug. 28, 2008

(51) Int. Cl.
*H04L 12/28* (2006.01)
*H04L 12/66* (2006.01)
*G06F 15/16* (2006.01)

(52) U.S. Cl. ........ 370/254; 370/392; 370/401; 370/409; 370/469; 709/220; 709/249

(58) Field of Classification Search .................. 370/254, 370/392, 401, 409, 469; 709/220, 249
See application file for complete search history.

(56) References Cited

U.S. PATENT DOCUMENTS

| | | | | |
|---|---|---|---|---|
| 6,167,052 A * | 12/2000 | McNeill et al. | .............. | 370/399 |
| 6,208,649 B1 * | 3/2001 | Kloth | .............. | 370/392 |
| 6,430,621 B1 * | 8/2002 | Srikanth et al. | .............. | 709/238 |
| 6,678,248 B1 * | 1/2004 | Haddock et al. | .............. | 370/235 |
| 6,735,198 B1 * | 5/2004 | Edsall et al. | .............. | 370/389 |
| 6,751,191 B1 * | 6/2004 | Kanekar et al. | .............. | 370/217 |
| 6,850,495 B1 * | 2/2005 | Baum et al. | .............. | 370/256 |
| 6,937,574 B1 * | 8/2005 | Delaney et al. | .............. | 370/254 |
| 6,980,549 B1 * | 12/2005 | Shabtay et al. | .............. | 370/392 |
| 6,993,026 B1 * | 1/2006 | Baum et al. | .............. | 370/392 |
| 7,006,431 B1 * | 2/2006 | Kanekar et al. | .............. | 370/217 |
| 7,203,762 B2 * | 4/2007 | Yamada et al. | .............. | 709/238 |
| 7,227,838 B1 * | 6/2007 | O'Riordan | .............. | 370/219 |
| 7,266,818 B2 * | 9/2007 | Pike et al. | .............. | 717/176 |
| 7,328,284 B2 * | 2/2008 | Rimmer | .............. | 709/250 |
| 7,391,719 B2 * | 6/2008 | Ellis et al. | .............. | 370/219 |
| 7,486,610 B1 * | 2/2009 | Bhupalam et al. | .............. | 370/216 |
| 7,577,142 B2 * | 8/2009 | Kloth | .............. | 370/392 |
| 7,586,895 B2 * | 9/2009 | Borgione | .............. | 370/349 |
| 7,590,120 B2 * | 9/2009 | Shuen et al. | .............. | 370/392 |
| 7,693,048 B1 * | 4/2010 | O'Riordan | .............. | 370/219 |
| 7,792,017 B2 * | 9/2010 | Lu et al. | .............. | 370/217 |
| 7,796,614 B1 * | 9/2010 | Weymans | .............. | 370/396 |
| 7,839,802 B2 * | 11/2010 | Baum et al. | .............. | 370/256 |
| 7,881,208 B1 * | 2/2011 | Nosella et al. | .............. | 370/242 |
| 2002/0052972 A1 * | 5/2002 | Yim | .............. | 709/245 |
| 2005/0234941 A1 * | 10/2005 | Watanabe | .............. | 707/100 |
| 2005/0240609 A1 * | 10/2005 | Mizuno et al. | .............. | 707/101 |
| 2005/0270980 A1 * | 12/2005 | McGee | .............. | 370/238 |
| 2005/0281190 A1 * | 12/2005 | McGee et al. | .............. | 370/216 |
| 2005/0281191 A1 * | 12/2005 | McGee et al. | .............. | 370/216 |
| 2006/0029097 A1 * | 2/2006 | McGee et al. | .............. | 370/468 |
| 2009/0129386 A1 * | 5/2009 | Rune | .............. | 370/392 |

* cited by examiner

*Primary Examiner* — Alpus H Hsu

(57) ABSTRACT

A computer system teams its network resource ports on a per virtual network basis. The system configures one or more virtual networks. For each of the one or more configured virtual networks, the system establishes a team comprising two or more of the network resource ports. The system selects a layer2 address that is uniquely associated with one of the ports of the team. The system assigns the selected unique layer2 address to be the primary layer2 address for the team.

20 Claims, 26 Drawing Sheets

NETWORK RESOURCE TEAMING ON A PER VIRTUAL NETWORK BASIS

BACKGROUND

Computers and other devices are commonly interconnected to facilitate communication among one another using any one of a number of available standard network architectures and any one of several corresponding and compatible network protocols. Packet switched network protocols are commonly employed with a number of architectures such as the Ethernet® standard. One of the most basic and widely implemented network types is the local area network (LAN). In its simplest form, a LAN is a number of devices (e.g. computers, printers and other specialized peripherals) connected to one another over a common broadcast domain using some form of signal transmission medium such as coaxial cable. Multiple physical LANs may be coupled together as two or more sub-networks of a more complex network via routers or equivalent devices, each of the LANs having a distinct broadcast domain.

Computers and other network devices employ network resources as a requisite physical interface with which to communicate with one another over a network such as a LAN. These network resources are sometimes referred to as network adapters or network interface cards (NICs). An adapter or NIC typically has at least one port through which a physical link or coupling may be provided between the processing resources of the network device within which it is deployed and the transmission medium of the network. Data is formatted and framed for transmission through the adapter port(s) of a transmitting network device and then received and deformatted by the adapter port(s) of the receiving network device. Network adapters or NICs are commercially available and are designed to support one or more variations of standard network architectures and known topologies, including Ethernet as described above.

In an Ethernet environment for example, each network device and its physical links to the network established through its network adapter ports are identified by the other devices on the network through protocol addresses (e.g. Internet Protocol (IP)) and media access control (MAC) addresses. The protocol addresses are said to be at layer 3, and the MAC addresses at layer 2, of the OSI (Open Systems Interconnection) basic reference networking model respectively. A protocol address at layer 3 is uniquely associated with a virtual interface established by software between each of a device's adapter port drivers and the protocol layer executed by its operating system (OS). The MAC address at layer 2 is used to uniquely identify each of a device's adapter ports is typically hard-programmed into each adapter or NIC at the time of its manufacture. Provision is typically made for this pre-assigned MAC address to be overwritten through software command.

Thus, the layer 3 protocol address is associated with the software side, and the layer 2 MAC address is associated with the hardware side, of a network device's link to the network. Devices coupled to a common broadcast domain of an Ethernet network, for example, identify each other by their MAC addresses. Network devices coupled to disparate broadcast domains communicate using their IP addresses through a device such as a router that couples or bridges the two distinct broadcast domains.

To improve the reliability of a network, redundant links have been established between a network device and a network through multiple adapter ports in the event that one of the links fails. Such redundant links have also been teamed to behave as a single virtual link to increase throughput of the virtual link by aggregating the combined throughput of the redundant links. Teams of network resources use a teaming driver to present a single interface to the protocol layer for the entire team of adapter ports, rather than one for each individual adapter or adapter port. This team interface is then assigned a team protocol address that identifies the virtual team interface. The teaming driver also presents a single driver interface to the network such that all teamed ports appear to the network to be a single virtual port having one MAC address assigned thereto. Such teams of resources have been implemented with various network redundancy schemes to optimize the configuration of the team for changing network conditions and/or to detect loss of connectivity in paths of the network to which members of the team are coupled.

A physical network can be further expanded by superimposing two or more virtual networks over the same physical network. Each of the virtual networks is logically distinct from the others and can therefore be isolated for security purposes. In the Ethernet context, for example, these logical networks are known as virtual LANs (VLANs). One or more VLANs may be assigned to one or more members of a physical team of adapter ports. Each VLAN is associated with its own protocol address and these VLAN protocol addresses replace the single protocol address associated with the virtual interface for the physical team. A data frame to be transmitted over a particular VLAN typically includes a VLAN tag uniquely associating that frame with that particular VLAN.

Network devices employing adapter port teaming, such as those employed as servers, typically receive input through a graphical user interface by which the available network resources of the device may be configured as one or more teams. Each team is established by the assignment of a unique subset of the available network resources. Each team is further characterized by configuration choices such as team type and the choice of available network redundancy techniques. Virtual networks such as VLANs may also be implemented using the same interface by assigning each team member to none, one or more of the desired VLANs.

Heretofore, each team member carries its physical configuration characteristics for each of the VLANs to which it is assigned. Put another way, the VLANs have been constrained to use each of the team members in the same role as they have been initially assigned during the configuration of the physical team. For example, if one of the NICs is configured as the primary for the physical team, all of the VLANs have been constrained to use this NIC as the primary NIC for those resources of the team associated with each VLAN. This may not be desirable for a number of reasons which will be apparent to those of skill in the art in view of the detailed description of the invention presented herein.

BRIEF DESCRIPTION OF THE DRAWINGS

For a detailed description of embodiments of the invention, reference will now be made to the accompanying drawings in which.

NOTATION AND NOMENCLATURE

Figure 1:
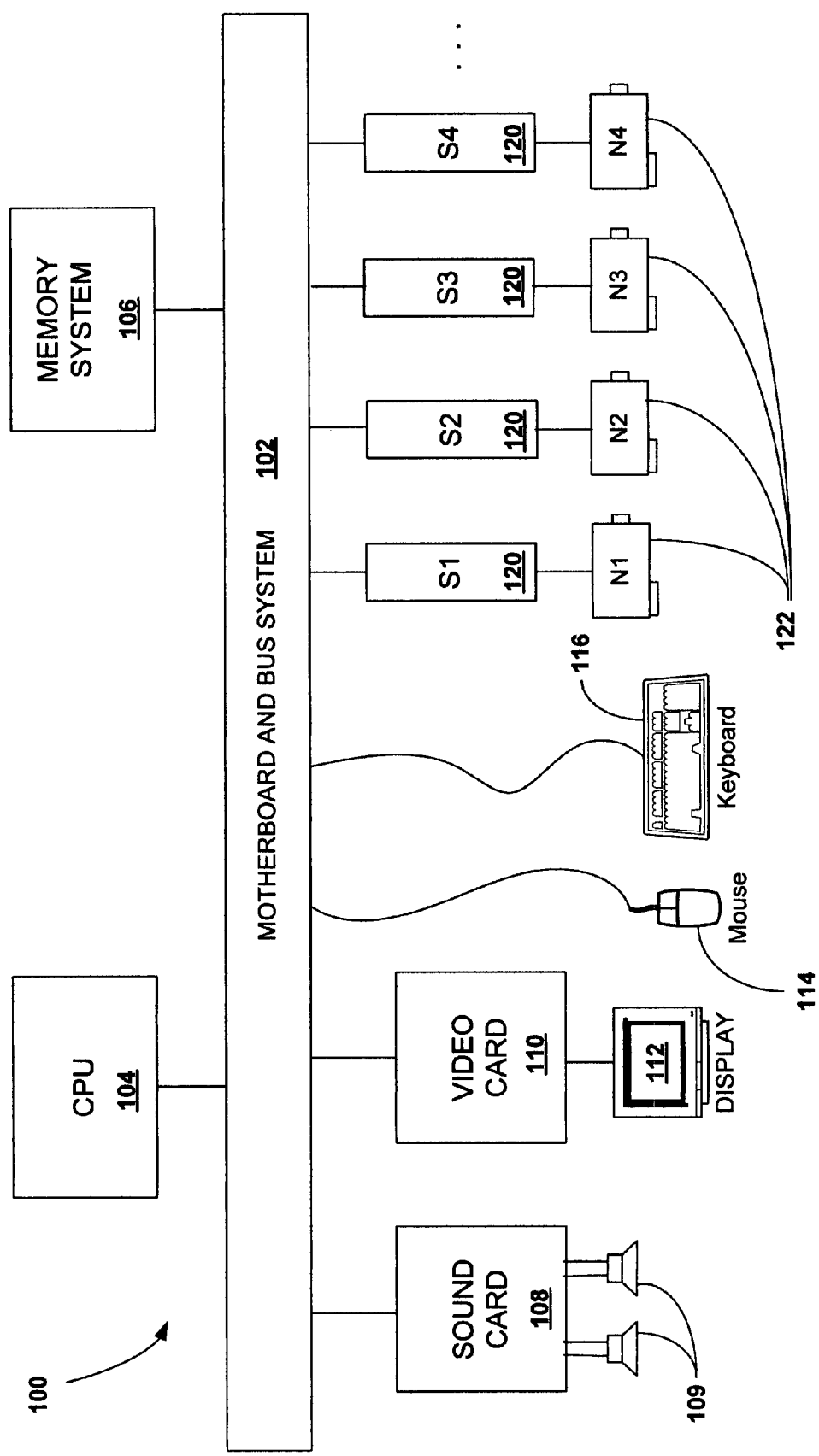
FIG. 1 is a block diagram that illustrates various features of a computer system, including some features by which the computer system is coupled to a network in accordance with an embodiment of the present invention.

Certain terms are used throughout the following description and in the claims to refer to particular features, apparatus, procedures, processes and actions resulting therefrom. For example, the term network resources is used to generally denote network interface hardware such as network interface cards (NICs) and other forms of network adapters known to those of skill in the art. Moreover, the term NIC or network adapter may refer to one piece of hardware having one port or several ports. While effort will be made to differentiate between NICs and NIC ports, reference to a plurality of NICs may be intended as a plurality of interface cards or as a single interface card having a plurality of NIC ports. Those skilled in the art may refer to an apparatus, procedure, process, result or a feature thereof by different names. This document does not intend to distinguish between components, procedures or results that differ in name but not function. In the following discussion and in the claims, the terms "including" and "comprising" are used in an open-ended fashion, and thus should be interpreted to mean "including, but not limited to . . . . "

DETAILED DESCRIPTION

The following discussion is directed to various embodiments of the invention. Although one or more of these embodiments may be preferred, the embodiments disclosed should not be interpreted as, or otherwise be used to limit the scope of the disclosure, including the claims, unless otherwise expressly specified herein. In addition, one skilled in the art will understand that the following description has broad application, and the discussion of any particular embodiment is meant only to be exemplary of that embodiment, and not intended to raise an inference that the scope of the disclosure, including the claims, is limited to that embodiment. For example, while the various embodiments may employ one type of network architecture and/or topology, such as Ethernet, those of skill in the art will recognize that the invention(s) disclosed herein may be readily applied to all other compatible network architectures and topologies as known to those of skill in the art. As by further example, while virtual networks and local area networks are terms that may have originated within the Ethernet environment, other network topologies can and do employ equivalents thereof even if denoted by other terms. Thus, neither this disclosure nor the claims appended hereto are intended to be, nor should they be, limited exclusively to the Ethernet architecture.

Embodiments of the invention provide the ability to configure teams of network resources on a per virtual network (e.g. VLAN) basis. In the past, the network resources have been configured at the physical level, and all virtual networks configured over the physical team have heretofore been constrained to use the resources as they were configured at the physical level. Thus, if the network resources were configured, for example, as a TLB (transmit load-balance) team with a first NIC designated as the primary NIC for the physical team, every virtual network configured over that team was constrained to use the first NIC as its primary NIC and any of the others associated with that virtual network as secondary (i.e. transmit only) resources.

Such a constraint can be less than optimal for some or all of the virtual networks for various reasons. For example, all receive traffic for all of the virtual networks are constrained to be handled by the first NIC, which can be less than optimal from a load-balancing perspective. In addition, advanced teaming techniques have been developed for switch redundant topologies that can identify which port of a team spread across different redundant switches provides connectivity to a certain node in the network, or even the lowest cost path to a Spanning Tree root switch close to the core of the network. If one or more such advanced teaming mechanisms have been enabled, once again the port identified as primary by such mechanisms may be optimal for a first virtual network, but may be non-optimal or even inoperative for other VLANs subsequently configured but constrained nevertheless to the choice of primary made for the physical network.

Embodiments of the invention as disclosed herein elevate the process of assigning primary ports and other teaming considerations from the physical level to the virtual network level, thereby eliminating the constraints that have heretofore rendered the implementation of virtual networks over teamed resources less than ideal.

Teams can be of various types providing different benefits. Network fault tolerant (NFT) teams are typically configured with only one port being "active" (commonly referred to as the primary port) with the remaining secondary members of the team placed in a "standby" or "inactive" mode. A secondary member is activated in the event of a detected failure of the adapter port currently designated as primary.

Transmit load-balanced (TLB) teams typically load-balance data transmitted from two or more active members of the team to other devices coupled to the network in accordance with some load-balancing policy implemented by the teaming driver. As with the NFT team described above, only one of the active team ports is designated as primary and thus enabled to receive all in-bound data traffic from devices on the network on behalf of the team. Also like the NFT team above, a failure of the current primary port of a TLB team typically precipitates a failover to a newly designated primary port chosen from the remaining active secondary adapter ports of the team.

Switch-assisted load-balanced (SLB) teams are able to aggregate both transmit and receive data over all active team members. The transmit load-balancing algorithm is, like the foregoing TLB team, implemented by the teaming driver. Load-balancing of the receive data is accomplished through a special switch interposed between the team and the network that has the intelligence to create a single virtual port or trunk for all of the physical team ports coupled to the switch and balances the traffic across the trunked ports based on a known load-balancing algorithm. In this case, no port need be designated as the primary (although the MAC address for one of the team ports is chosen as the MAC address for the team), as all members are configured to receive data addressed to the single team MAC address in accordance with a load-balancing algorithm executed by the switch.

A more detailed explanation of a system for teaming network resources through a configurator to achieve the above-described NFT, TLB and SLB teams is presented in U.S. application Ser. No. 11/048,524, filed Feb. 1, 2005, entitled "Dynamic Allocation and Configuration of a Computer System's Network Resources," which is incorporated herein in its entirety by this reference.

Some more advanced team types have been developed to provide better load-balancing in the context of redundant switch network topologies. One such team type is sometimes referred to as channel based TLB. For this team type, some of the team ports are aggregated through an SLB switch to provide full transmit and receive load balancing. All of these ports act as a single port and this single aggregated group of ports is designated as the primary for a TLB team. Other team ports can be coupled to other redundant switches, and act as transmit only ports for the team. Typically, the number of primary group (or channel) ports is greater than those acting as secondary transmit only ports, to improve the number of team ports receiving full load-balanced traffic. This type of team can have two or more groups of one or more NICs, with one of the groups being designated as the primary. A more detailed explanation of a system for teaming network resources as a channel based TLB team is presented in U.S. application Ser. No. 11/208,689, filed Aug. 22, 2005, entitled "Network Resource Teaming Combining Receive Load-Balancing with Redundant Network Connections," now U.S. Pat. No. 7,646,708, which is incorporated herein in its entirety by this reference.

Another advanced team type is sometimes referred to as a dual channel team. In this case, two groups of team ports are each coupled to redundant SLB capable switches that are trunked together as a single port for full transmit and receive load balancing. In this case, each group (or channel) is assigned a different MAC address, even though they both are associated with the same team IP address. An ARP (Address Resolution Protocol) intercept process balances traffic inbound to the server from the network by providing some of the clients on the network with one of the channel MAC addresses, while providing some of the other clients with the second channel MAC address. Each switch then provides full load balancing for the in and outbound traffic among the trunked team ports to which it is coupled. A more detailed explanation of a system for teaming network resources as a dual channel team is presented in U.S. application Ser. No. 11/208,690, filed Aug. 22, 2005 entitled "Network Resource Teaming Providing Resource Redundancy and Transmit/Receive Load-Balancing through a Plurality of Port Trunks," which is incorporated herein in its entirety by this reference.

As previously mentioned, some advanced teaming techniques have also been developed to enhance resource port teaming in the context of redundant switch technologies. One of these techniques endeavors to choose a primary for the team that provides a path to the core of the network to which it is coupled that is optimal in cost. This technique is sometimes referred to as Fast Path and enables the teaming mechanism to listen for Spanning Tree BPDUs (Bridge Protocol Data Units) to ascertain which team port provides the lowest cost path to a root switch that is close to or in the core of the network to which it is coupled. The Fast Path mechanism then chooses that team port as the primary for the team. A more detailed explanation of a system for teaming network resources using the Fast Path mechanism is presented in U.S. application Ser. No. 11/048,520, filed Feb. 1, 2005, entitled "Automated Selection of an Optimal Path between a Core Switch and Teamed Network Resources of a Computer System," which is incorporated herein in its entirety by this reference.

A second advanced teaming technique provides the teaming mechanism with the ability to monitor connectivity with a node device that preferably resides within or near the core of the network to which the team is coupled. This technique, sometimes referred to as Active Path, enables the primary port to receive frames transmitted from the remote port to verify connectivity with that node, and thus the core of the network. The device can be a predetermined node, called an echo node, and the process is active in the sense that the team sends frames to the echo node and listens for a response. A detailed explanation of this advanced teaming mechanism is disclosed in U.S. patent application Ser. No. 10/898,399, filed Jul. 23, 2004, entitled "Method and System for Monitoring Network Connectivity," now U.S. Pat. No. 7,639,624, which is incorporated herein in its entirety by this reference.

A second Active Path implementation passively listens for VRRP/HSRP frames typically transmitted by a router to monitor connectivity with that router. Because the Fast Path and Active path mechanisms may conflict in their selection of which team port should be the primary, a user will typically prioritize these mechanisms when they are both active to determine which mechanism gets to choose the primary port for the team if there is a disagreement between them. A detailed explanation of this advanced teaming technique is disclosed in U.S. application Ser. No. 11/048,526, filed Feb. 1, 2005, entitled "Monitoring Path Connectivity between Teamed Network Resources of a Computer System and a Core Network," which is incorporated herein in its entirety by this reference.

An additional advanced teaming mechanism that can be made available is to monitor for a "Split LAN" condition in the network. This technique typically uses one of the aforementioned advanced teaming techniques (e.g., Fast Path or Active Path) to sense whenever the primary port of a configured team has been isolated from the core of a network. In this case, the absence of the frames for which the primary port is listening to determine connectivity with the core network (Active Path) or receipt of frames from more than one root switch (Fast Path) can be used to indicate that a team coupled to a redundant topology network has been split into two isolated segments. This information can also be used to initiate a primary port failover to another port to provide improved connectivity to the core (and thus a larger portion) of the network. A detailed explanation of the Split LAN advanced teaming feature is disclosed in U.S. application Ser. No. 11/048,523, filed Feb. 1, 2005, entitled "Automated Recovery from a Split Segment Condition in a Layer2 Network for Teamed Network Resources of a Computer System," which is incorporated herein in its entirety by this reference.

As previously mentioned, in the past, all of the foregoing teaming techniques have been performed strictly at the physical level. Once teamed in a certain manner at the physical level, any virtual networks configured using the teamed resources have been constrained to use the resources on a per virtual network basis only in their roles previously assigned as a member of the physical team. Embodiments of the present invention permit the teaming of the network resource ports at the virtual network level, and the teaming characteristics of those ports can be different for each virtual network configured. Put another way, the resources may be teamed on a per virtual network basis as will be described below.

Teaming the resource ports on a per virtual network basis allows different ports to be designated as primaries for different virtual networks, facilitating the balancing of traffic among the virtual networks. Moreover, advanced teaming techniques such as Fast Path and Active Path may also be configured on a per virtual network basis, allowing each virtual network to have a primary port that is optimal in cost (in the case of Fast Path) for that virtual network, or that monitors connectivity with a node that is pertinent to each virtual network.

FIG. 1 is a block diagram of a computer system 100 that illustrates various features of a computer system 100 that may be used to couple it to a network in accordance with an embodiment of the present invention. The computer system 100 can be an industry standard server or any computer or peripheral system that can be coupled to a network, and may include a motherboard and bus system 102 coupled to at least one central processing unit (CPU) 104, a memory system 106, a video card 110 or the like, a mouse 114 and a keyboard 116. The motherboard and bus system 102 can be any kind of bus system configuration, such as any combination of the following: a host bus, one or more peripheral component interconnect (PCI) buses, an industry standard architecture (ISA) bus, an extended ISA EISA) bus, a microchannel architecture (MCA) bus, etc. Also included but not shown are bus driver circuits and bridge interfaces, etc., as are known to those skilled in the art.

The CPU 104 can be any one of several types of microprocessors and can include supporting external circuitry typically used in industry standard servers, computers and peripherals. The types of microprocessors may include the 80486, Pentium®, Pentium II®, etc. all microprocessors from Intel Corp., or other similar types of microprocessors such as the K6® microprocessor by Advanced Micro Devices. Pentium® is a registered trademark of Intel Corporation and K6® is a registered trademark of Advanced Micro Devices, Inc. Those of skill in the art will recognize that processors other than Intel compatible processors can also be employed. The external circuitry can include one or more external caches (e.g. a level two (L2) cache or the like (not shown)). The memory system 106 may include a memory controller or the like and may be implemented with one or more memory boards (not shown) plugged into compatible memory slots on the motherboard, although any memory configuration is contemplated. The CPU 104 may also be a plurality of such processors operating in parallel.

Other components, devices and circuitry may also be included in the computer system 100 that are not particularly relevant to embodiments of the present invention and are therefore not shown for purposes of simplicity. Such other components, devices and circuitry are typically coupled to the motherboard and bus system 102. The other components, devices and circuitry may include an integrated system peripheral (ISP), an interrupt controller such as an advanced programmable interrupt controller (APIC) or the like, bus arbiter(s), one or more system ROMs (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc.

The computer system 100 may further include one or more output devices, such as speakers 109 coupled to the motherboard and bus system 102 via an appropriate sound card 108, and monitor or display 112 coupled to the motherboard and bus system 102 via an appropriate video card 110. One or more input devices may also be provided such as a mouse 114 and keyboard 116, each coupled to the motherboard and bus system 102 via appropriate controllers (not shown) as is known to those skilled in the art. Other input and output devices may also be included, such as one or more disk drives including floppy and hard disk drives, one or more CD-ROMs, as well as other types of input devices including a microphone, joystick, pointing device, etc. The input and output devices enable interaction with a user of the computer system 100 for purposes of configuration, as further described below. It will be appreciated that different combinations of such input/output and peripheral devices may be used in various combinations and forms depending upon the nature of the computer system.

The motherboard and bus system 102 is typically implemented with one or more expansion slots 120, individually labeled S1, S2, S3, S4 and so on, where each of the slots 120 is operable to receive compatible adapter or controller cards configured for the particular slot and bus type. Typical devices configured as adapter cards include network interface cards (NICs), disk controllers such as a SCSI (Small Computer System Interface) disk controller, video controllers, sound cards, etc. The computer system 100 may include one or more of several different types of buses and slots known to those of skill in the art, such as PCI, ISA, EISA, MCA, etc. In an embodiment illustrated in FIG. 1, a plurality of NIC adapter cards 122, individually labeled N1, N2, N3 and N4 each providing a single adapter port are shown coupled to the respective slots S1-S4. The bus interconnecting slots 120 and the NICs 122 is typically dictated by the design of the adapter card itself.

As described more fully below, each of the NICs 122 enables the computer system to communicate through at least one port with other devices on a network to which the NIC ports are coupled. The computer system 100 may be coupled to at least as many networks as there are NICs (or NIC ports) 122. When multiple NICs or NIC ports 122 are coupled to the same network as a team, each provides a separate and redundant link to that same network for purposes of providing traffic load balancing and/or system fault tolerance. Additionally, two or more of the NICs (or NIC ports) 122 may be split between distinct paths or segments of a network that ultimately connect to a core switch.

Figure 2:
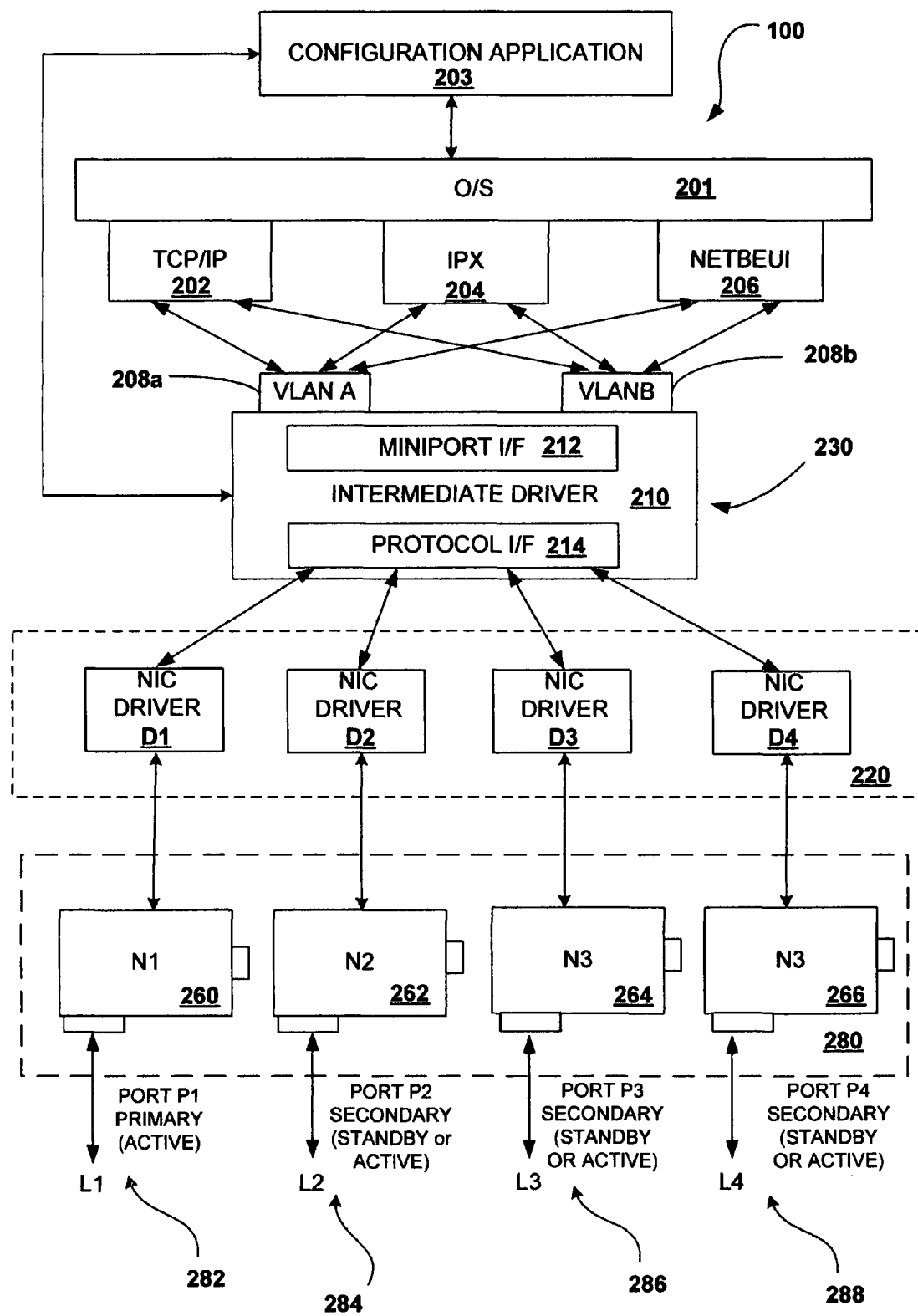
FIG. 2 is a block diagram of the computer system of FIG. 1 that illustrates some features that may be used to team network resources of the computer system to the network in accordance with an embodiment of the present invention.

FIG. 2 illustrates a teaming mechanism and an input interface to that mechanism for server 100 that be used to implement the invention. As previously mentioned, for a team of network adapter ports to operate as a single virtual adapter, all devices on the network must communicate with the team using only one layer-3 address, and except for those teaming mechanisms that employ ARP intercept, a single layer-2 address. Put another way, a network device must see only one layer-2 (e.g. MAC) address and one protocol address (e.g. IP, IPX) for a team, regardless of the number of adapter ports that make up the team. For Ethernet networks, devices that wish to communicate with one another must first ascertain the MAC address for each device in accordance with the address resolution protocol (ARP). The requesting device issues an ARP request for a particular IP address, and the device assigned to that IP address recognizes the request is directed to it and responds to the requesting device with its MAC address. The requesting device stores that MAC address in association with the IP address in an ARP table it maintains. The IP protocol address of a team will have only one entry in the requesting device's ARP table (i.e. one MAC address and one IP address) for the entire team. In the case of teams employing ARP intercept, the teaming mechanism will issue one of a number of MAC addresses in response to an ARP request, each of those MAC addresses associated with a team channel, each team channel consisting of one port, or multiple ports that are trunked through a switch to appear to the team as a single port.

The computer system 100 of FIG. 2 is configured with four NICs N1 260 through N4 266, each providing one NIC port 282-288. Each NIC port has a corresponding instantiation of the appropriate drivers D1, D2, D3 and D4 for purposes of illustration. Each instantiation of a driver D1 through D4 is the driver necessary to control each the corresponding ports. The computer system 100 has installed within it an appropriate operating system (OS) 201 that supports networking, such as Microsoft NT, Novell Netware, Windows 2000, or any other suitable network operating system. The OS 201 includes, supports or is otherwise loaded with the appropriate software and code to support one or more communication protocols, such as TCP/IP 202, IPX (Internet Protocol exchange) 204, NetBEUI (NetBIOS (NETwork Basic Input/Output System) Extended User Interface) 206, etc. A configuration application program 203 runs in conjunction with OS 201.

An embodiment of configuration application 203 provides a graphical user interface (GUI) through which users may program configuration information regarding the initial teaming of the NICs. Additionally, the configuration application 203 receives current configuration information from the teaming driver 210 that can be displayed to the user using the first GUI on display 112, including the status of the resources for its team (e.g. "failed," "degraded," "standby" and/or "active"). Techniques for graphically displaying teaming configurations and resource status are disclosed in detail in U.S. Pat. No. 6,229,538 entitled "Port-Centric Graphic Representations of Network Controllers," which is incorporated herein in its entirety by this reference. Application 203 provides commands by which the resources can be allocated to teams and reconfigured. A user can interact with the configuration program 203 through the GUIs via one or more input devices, such as the mouse 114 and the keyboard 116 of FIG. 1 and one or more output devices, such as the display 112, FIG. 1. It will be appreciated that the GUI can be used remotely to access configuration program 203, such as over a local network or the Internet for example.

To accomplish teaming of a plurality of network adapters, an instance of an intermediate driver residing at the Intermediate Driver Layer 210 causes the drivers D1-D4 for each of the NIC ports to function seamlessly as one virtual driver 220. For each physical team of NIC adapter ports, there will be a separate instance of the intermediate driver at the Intermediate Driver Layer 210, each instance being used to tie together those NIC drivers that correspond to the NIC ports belonging to that team. Each instance of a teaming driver presents a single virtual interface to each instance of a protocol (202, 204 and or 206) being executed by the OS 201. That virtual interface is assigned one IP address. If the server is configured with virtual networks (e.g. VLANs A 208a and B 208b), virtual interfaces for each VLAN are presented to the protocol layer, with each VLAN having been assigned its own unique protocol address.

The intermediate driver 210 also presents a single protocol interface to each of the NIC drivers D1-D4 and the corresponding NIC ports 282, 284, 286 and 288 of NICs N1 260, N2 262, N3 264, and N4 266. Because each instance of the intermediate driver 210 can be used to combine two or more NIC drivers into a team, a user may configure multiple teams of any combination of the ports of those NICs currently installed on the computer system 100. By binding together two or more drivers corresponding to two or more ports of physical NICs, data can be, for example, transmitted and received through one of the two or more ports (in the case of an NFT team) or transmitted through all of the two or more ports and received through one for a TLB team), with the protocol stacks interacting with what appears to be only one logical device.

As previously discussed a fault tolerant team is typically employed where the throughput of a single NIC port is sufficient but fault tolerance is important. As an example, the NIC ports 282, 284, 286 and 288, providing redundant links L1 through L4 to a network can be configured as a network fault tolerance (NFT) team. For an NFT team, one of the NIC ports (e.g. port 282 of N1 260) is initially assigned as the primary and NIC N1 260 is placed in the "active" mode. This assignment can be accomplished by default (e.g. the teaming driver 210 simply chooses the team member located in the lowest numbered slot as the primary member and assigns it the team MAC address) or manually through the GUI and configuration application 203. For the NFT team, ports 284, 286 and 288 are designated as "secondary" and their respective NICs N2 262, N3 264 and N4 266 are placed in a "standby" mode.

The port provided by the primary team member transmits and receives all packets on behalf of the team. If the active link (i.e. L1) fails or is disabled for any reason, the computer system 100 (the teaming driver 210 specifically) can detect this failure and switch to one of the secondary team members by rendering it the active (and primary) member of the team while placing the failed member into a failed mode until it is repaired. This process is sometimes referred to as "failover" and involves reassigning the team MAC address to the NIC port that is to be the new primary. Communication between computer system 100 and devices in a network to which the team is coupled is thereby maintained without any significant interruption. Those of skill in the art will recognize that an embodiment of an NFT team can have any number of redundant links in an NFT team, and that one link of the team will be active and all of the others will be in standby. A TLB team is configured in a similar manner, except that the secondary NICs are placed in transmit only mode, rather than standby. A more detailed explanation of a system for teaming network resources through a configurator as discussed above is presented the above-referenced U.S. application Ser. No. 11/048,524.

Figure 3A:
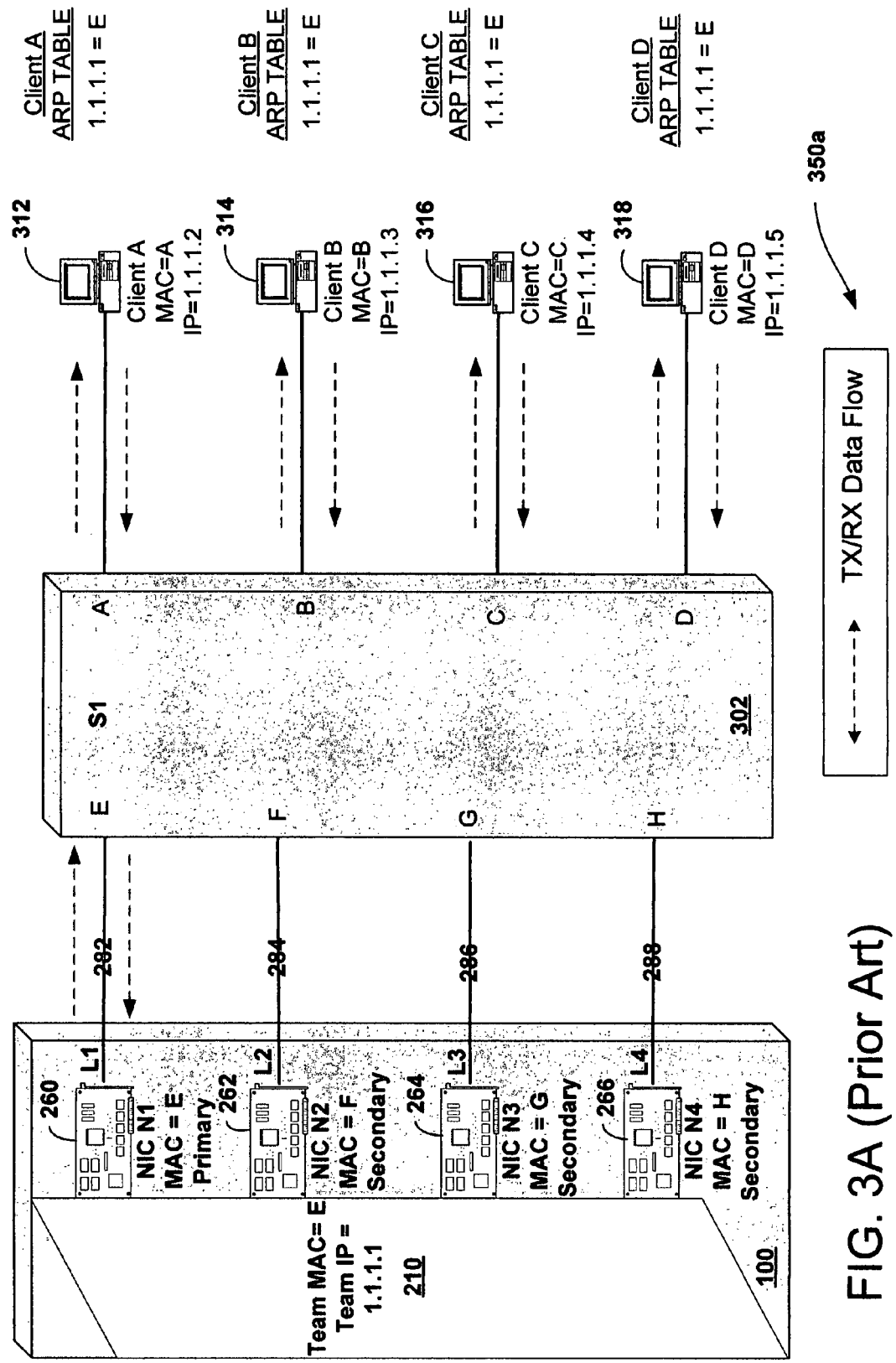
FIG. 3A is a block diagram illustrating the traffic flow over a network for network resources of the system of FIG. 2 configured as an NFT team at the physical level in accordance with the prior art.

FIG. 3A illustrates the traffic flow 350a between the ports 282, 284, 286 and 288 of network resources NICs N1 260-N4 268 respectively, configured at the physical level as an NFT team in accordance with the prior art, and a network including switch 302 through which client devices A 352, B 354, C 356 and D 358 communicate with server 100 and its teamed resources. The MAC address for the team=E and has been assigned to NIC N1 260, the primary member of the team. All of the other resources are secondary members of the NFT team and are placed in standby mode until needed. Thus, primary NIC N1 260 transmits all traffic to the clients and receives all traffic from the clients over port 282. One of the other members of the team will be activated only in the event that NIC N1 260 fails, at which time the newly activated port will be assigned the team MAC address E and as such becomes the primary for the team. The team is seen as a single virtual device to the rest of the network as indicated by the single entry for system 100 in the respective ARP tables of client devices A 352, B 354, C 356 and D 358.

Figure 3B:
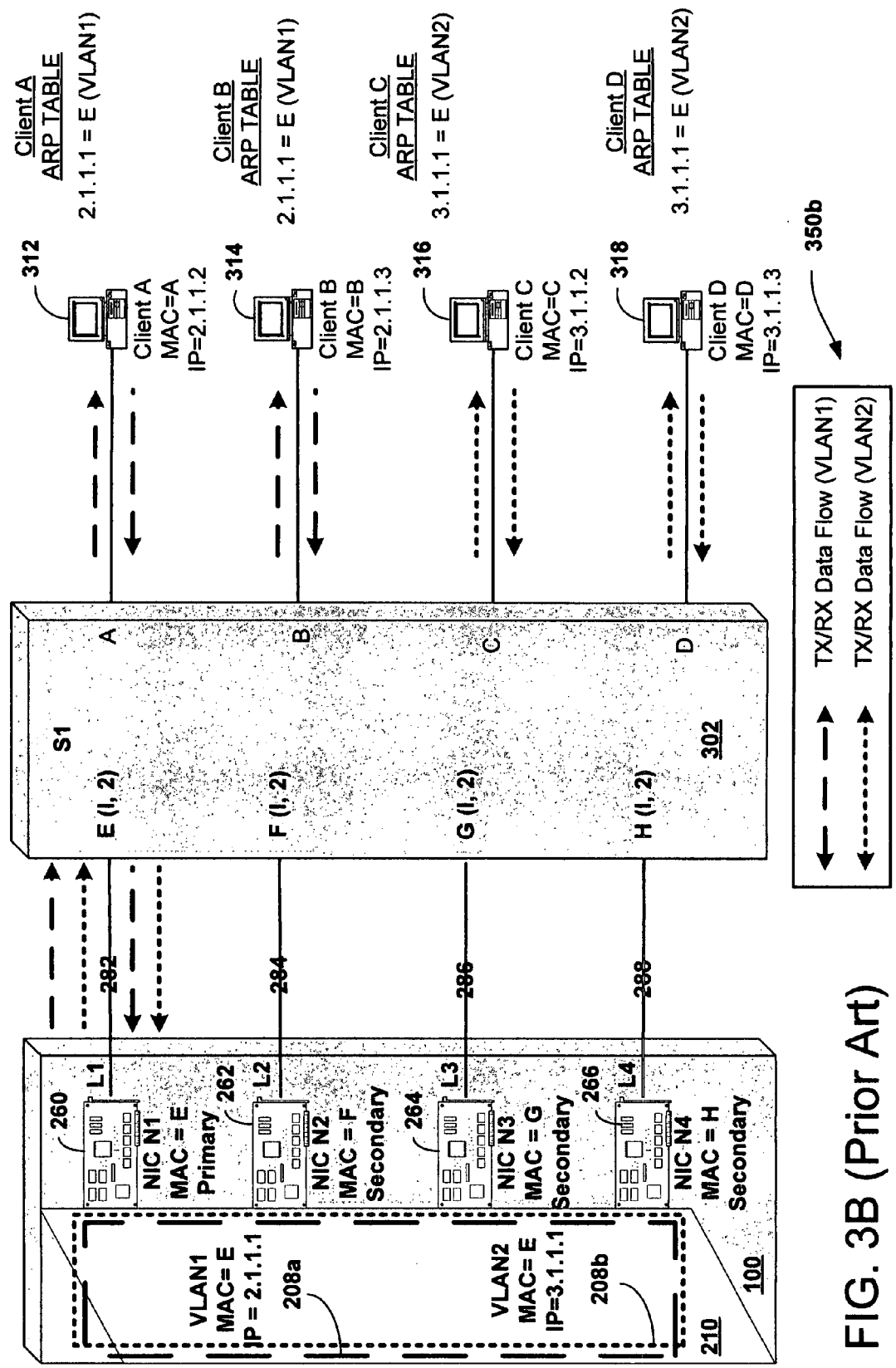
FIG. 3B is a block diagram illustrating the traffic flow over the network for the NFT team of FIG. 3A with two VLANs configured over the physical team in accordance with the prior art.

FIG. 3B illustrates traffic flow 350b for virtual networks VLAN1 208a and VLAN2 208b configured over the NFT team of FIG. 3A in accordance with the prior art. As illustrated, virtual networks VLAN1 208a and VLAN2 208b are configured for communicating with the clients A 352, B 354, C 356 and D 358 through network switch S1 302. In this example, clients A 352, B 354 are members of VLAN1 208a and clients C 356 and D 358 are associated with VLAN2 208b. In this example, each virtual network is configured to include all four teamed ports. As those skilled in the art will appreciate, configuration of the virtual networks require that switch S1 302 be also programmed to associate its ports with one or more of the virtual networks as well. The VLANs with which each port is associated are indicated parenthetically for each port coupled to the team.

As previously discussed, virtual networks configured over teamed network resources in accordance with the prior art were constrained to use the team as configured at the physical level. Thus, both virtual networks are required to use NIC N1 260 as their primary port. As a result, all transmit and receive traffic (i.e. outbound and inbound network traffic with reference to the team), must be handled by the same port 282 as illustrated. The remaining NICs of the team act as secondary team members for each of the VLANs and are placed in standby mode until a failure of the primary NIC1 260 requires a failover to one of the secondary NICs of the team.

Figure 3C:
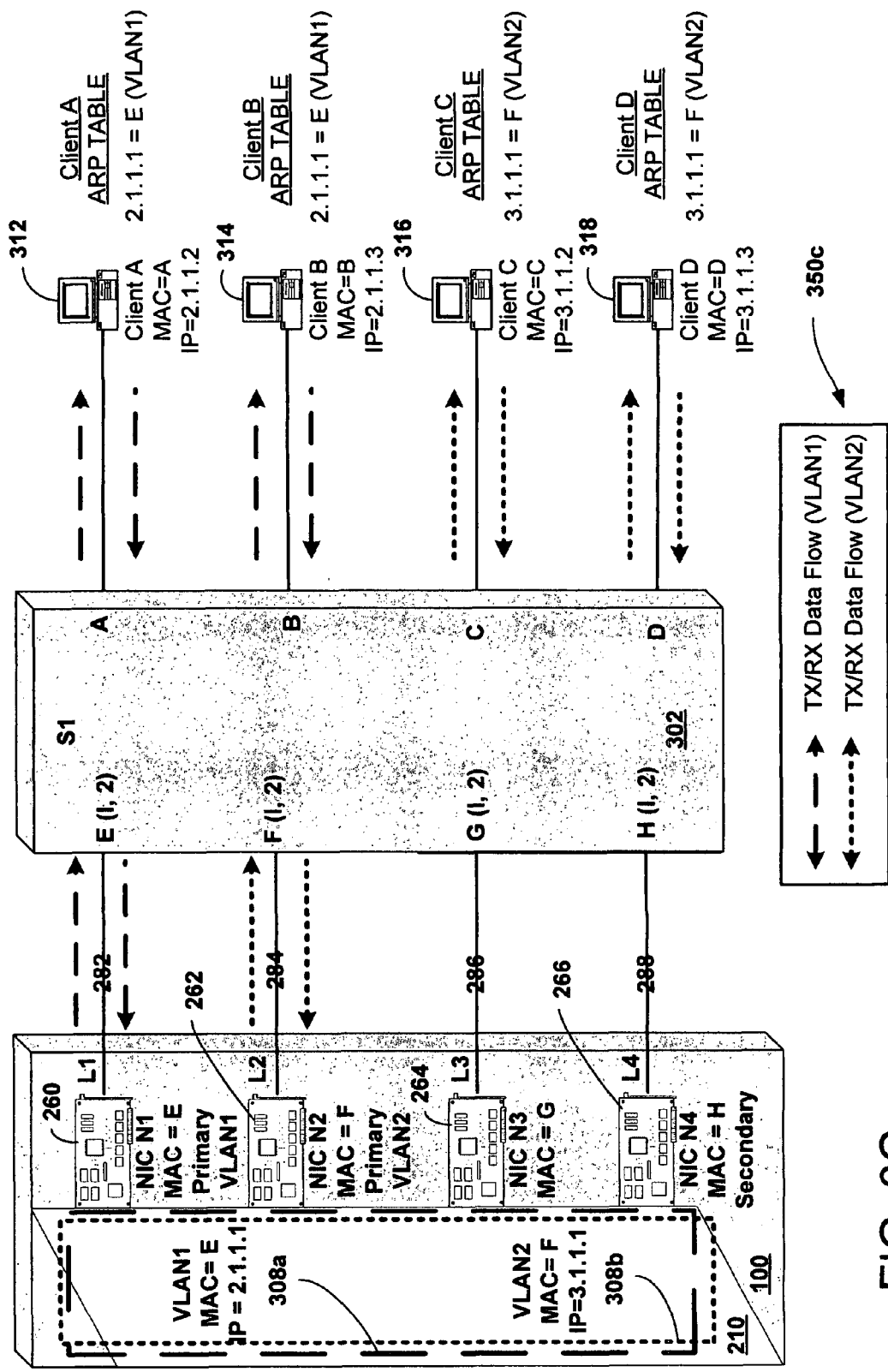
FIG. 3C is a block diagram illustrating the traffic flow over the network for two VLANs each independently configured at the virtual network level to use the network resources of the system of FIG. 2 as an NFT team in accordance with an embodiment of the invention.

FIG. 3C illustrates the traffic flow 350c for two virtual networks VLAN1 308a and VLAN2 308b that have been configured in accordance with an embodiment of the invention. The resources have been independently teamed for each virtual network, with each virtual network configured to use all four ports 282, 284, 286 and 288 as an NFT team in accordance with an embodiment of the invention. Also, as required, each port of switch S1 302 has been associated with both VLANs. Each VLAN team, however, has been assigned its own unique primary port. The NFT team for VLAN1 308a has been configured to use NIC N1 260 as its primary port 282, with NICs N2 262, N3 264 and N4 266 providing secondary ports 284, 286 and 288 in the event that port 282 of NIC N1 260 fails. The team MAC address for VLAN1 308a=E, as illustrated by the ARP table for clients A 352 and B 354. VLAN2 308b has been configured to use NIC N2 262 as its primary port 284, with NICs N1 260, N3 264 and N4 266 acting as secondary ports 282, 286 and 288 respectively for purposes of fault tolerance. The team MAC address for VLAN2 308b=F, as illustrated by the ARP table for clients C 356 and D 358. A user can also independently prioritize the secondary ports for each virtual network team to determine which secondary port will become the next primary port if the first primary port should fail for either virtual network team. It will be apparent to those of skill in the art that the inbound and outbound traffic is more balanced using a different primary for each virtual network.

Figure 3D:
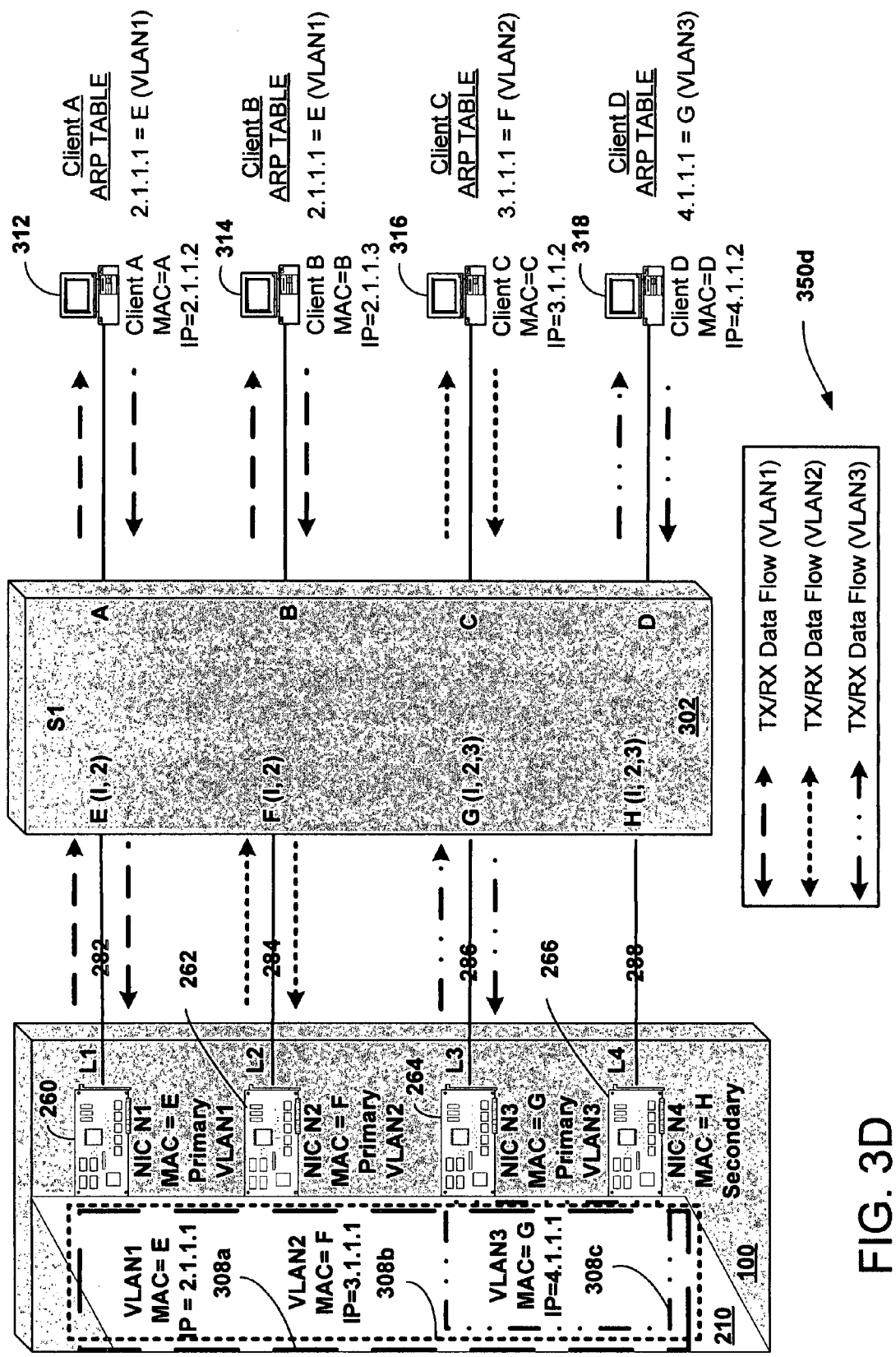
FIG. 3D is a block diagram illustrating the traffic flow over the network for three VLANs each independently configured at the virtual network level to use the network resources of the system of FIG. 2 as an NFT team in accordance with an embodiment of the invention.

FIG. 3D illustrates the traffic flow 350d for the two virtual networks VLAN1 308a and VLAN2 308b, which are independently configured in accordance with an embodiment of the invention as described above with reference to FIG. 3C, as well as a third virtual network VLAN3 308c. The resources have also been independently configured as a unique NFT team for virtual network VLAN 30& in accordance with an embodiment of the invention. In this example, client D 318 is now associated with VLAN3 308c. VLAN3 308c has been configured to use NIC N3 264 as its primary port 286 and NIC N4 266 as its secondary port 288 to provide fault tolerance in case primary port 286 provided by NIC N3 264 fails. Switch S1 302 has been reprogrammed to also associate ports 286 and 288 with VLAN3. Thus, the team MAC address for VLAN1 308a=E, the team MAC address for VLAN2 308b=F and the team MAC address for VLAN3 308c=G. Again, by creating the teams independently at the virtual network level, different primary ports may be assigned for each virtual network team and thus the inbound and outbound traffic is more balanced over the available ports 282, 284, 286 and 288.

Figure 4A:
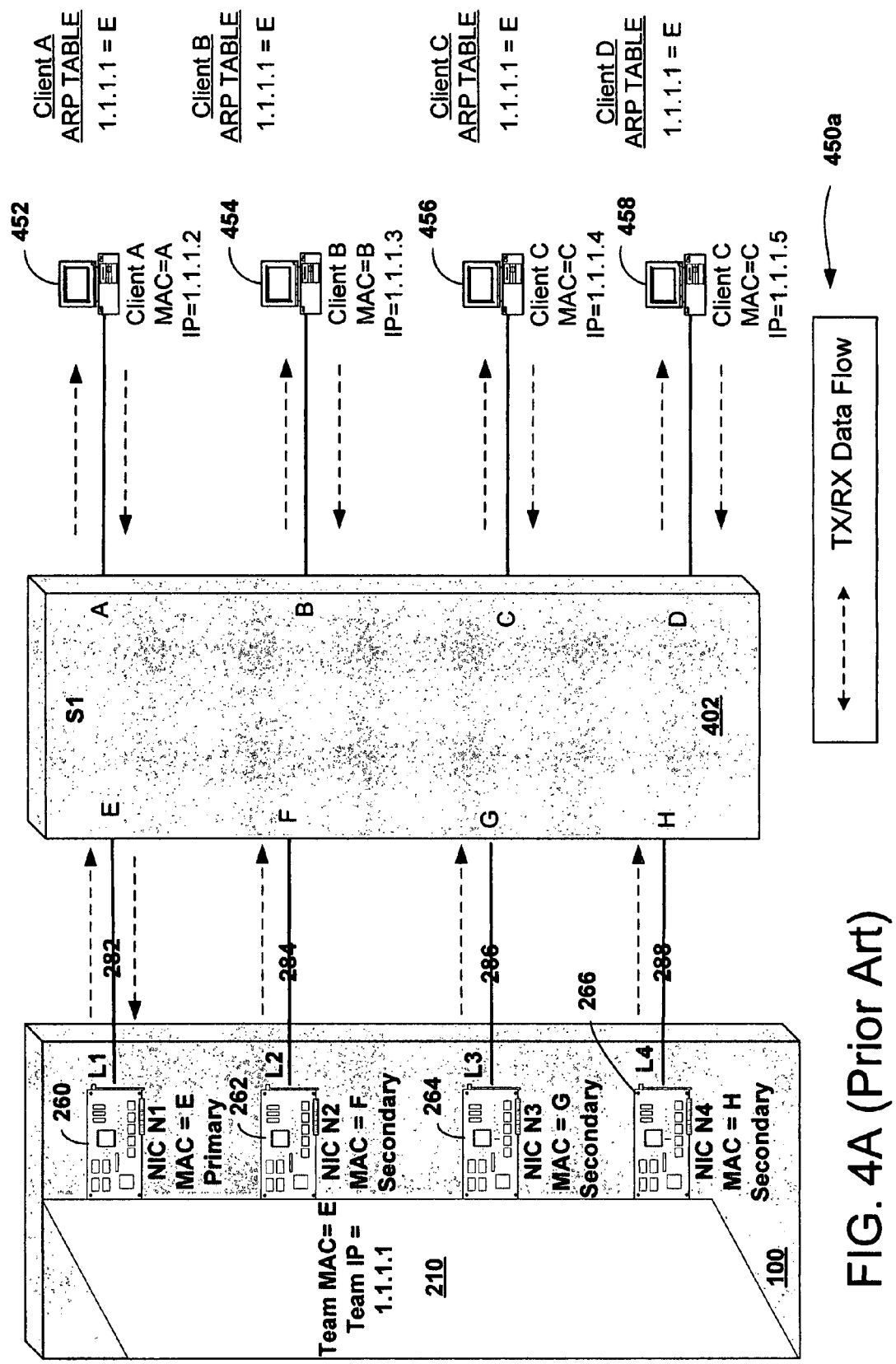
FIG. 4A is a block diagram illustrating the traffic flow over a network for network resources of the system of FIG. 2 configured as a TLB team at the physical level in accordance with the prior art.

FIG. 4A illustrates the traffic flow 450a between the network resources NICs N1 260-N4 268, configured as a TLB team at the physical level in accordance with the prior art, and a network including switch S1 402 through which client devices A 452, B 454, C 456 and D 458 communicate with server 100 and its teamed resources. The MAC address for the team=E and has been assigned to NIC N1 260, the primary member of the team. All of the other resources are secondary members that can transmit traffic to the network on behalf of the team, but are unable to receive data for the team because their MAC addresses are different than the team MAC address. The transmit load-balancing algorithm for the team is executed by the teaming driver 210. Thus, primary NIC N1 260 receives all traffic from the clients over port 282. One of the other members of the team can be designated as the primary port (i.e. will be given the team MAC address E) in the event that NIC N1 260 fails and a failover is initiated. The physical team is seen by the network as a single virtual device as indicated by the single MAC address entry for system 100 in the respective ARP tables of client devices A 452, B 454, C 456 and D 458.

Figure 4B:
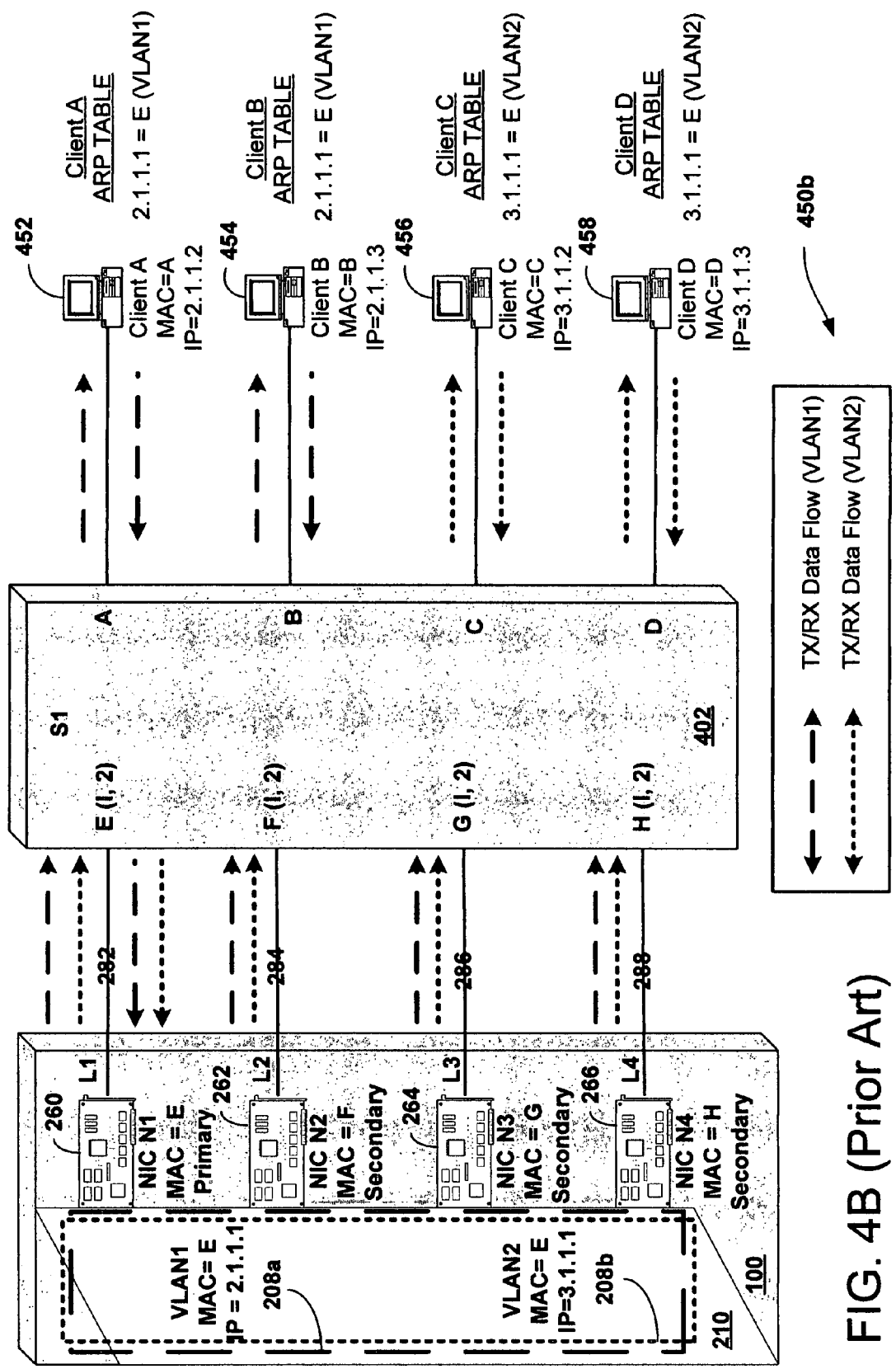
FIG. 4B is a block diagram illustrating the traffic flow over the network for the TLB team of FIG. 4A with two VLANs configured over the physical team in accordance with the prior art.

FIG. 4B illustrates traffic flow 450b for virtual networks VLAN1 208a and VLAN2 208b, configured over the physical TLB team of FIG. 4A in accordance with the prior art. As illustrated, virtual networks VLAN1 208a and VLAN2 208b are each configured to communicate with the clients A 452, B 454 (VLAN1 208a) and clients C 456 and D 458 (VLAN2 208b) through network switch S1 402. Each virtual network is configured to include all four teamed NICs N1 260, N2 262, N3 264 and N4 266, providing ports 282, 284, 286 and 288 respectively. Switch S1 402 has been configured to associate each of the four ports 282, 284, 286 and 288 with both virtual networks as well. As previously discussed, virtual networks configured over network resources teamed at the physical level in accordance with the prior art were constrained to use the team as configured at the physical level. Thus, both virtual networks are required to use NIC N1 206 as their primary port 282 and as such, all receive traffic (i.e. inbound network traffic) for both virtual networks must be handled by the same primary port 282 as illustrated.

Figure 4C:
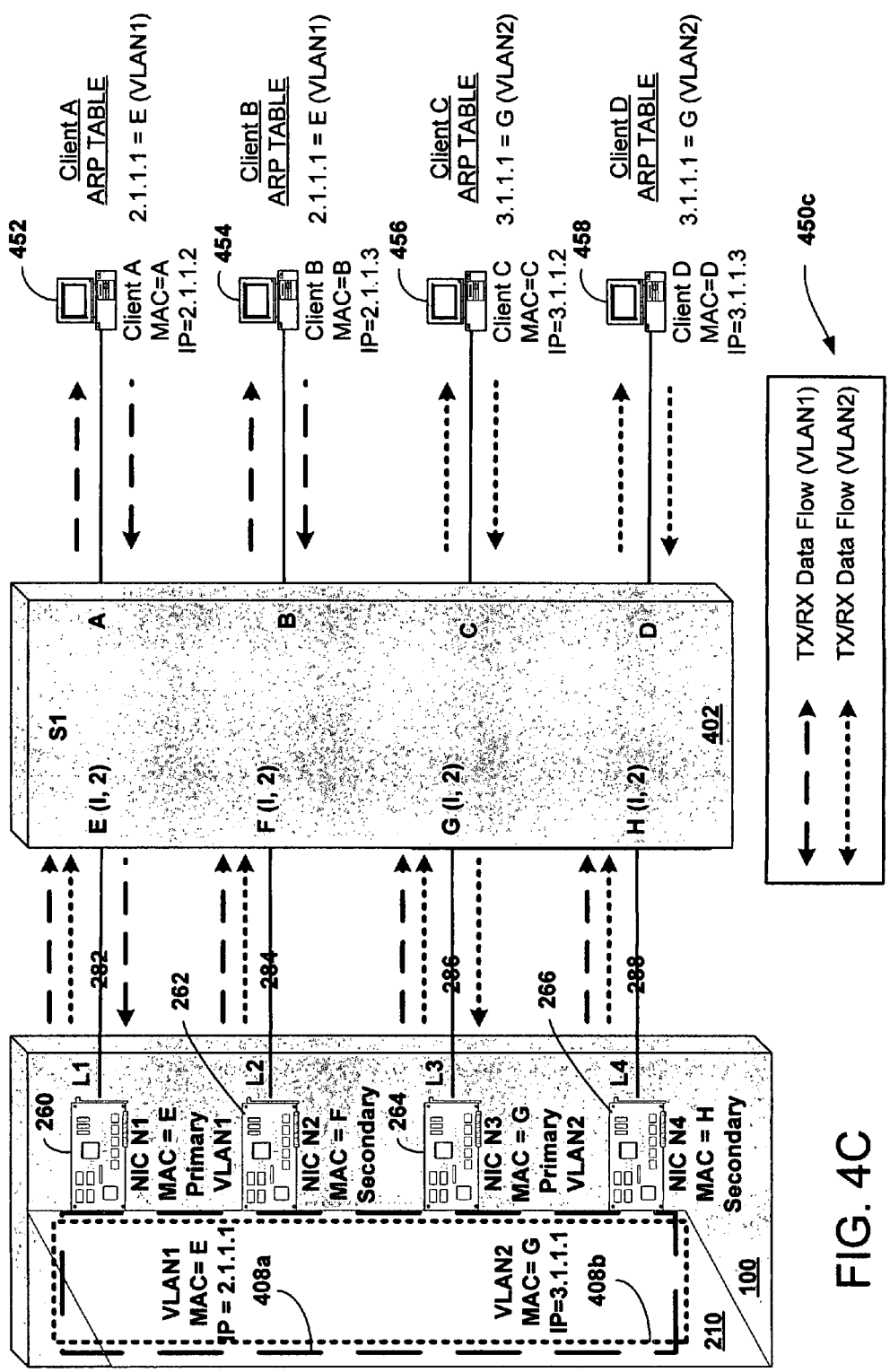
FIG. 4C is a block diagram illustrating the traffic flow over the network for two VLANs each independently configured at the virtual network level to use the network resources of the system of FIG. 2 as a TLB team in accordance with an embodiment of the invention.

FIG. 4C illustrates the traffic flow 450c for two virtual networks VLAN1 408a and VLAN2 408b, each of which have been configured in accordance with an embodiment of the invention. In this example, the network resources have been independently teamed for each virtual network, with each virtual network configured to use all four ports 282, 284, 286 and 288 as an independent TLB team in accordance with an embodiment of the invention. VLAN1 408a has been configured to use NIC N1260 as its primary port 282, with NICs N2 262, N3 264 and N4 266 providing secondary ports 284, 286 and 288 respectively that are transmit only for the team. The secondary ports 284, 286 and 288 also provide fault tolerance for the team of VLAN1 408a in the event that NIC N1 260 fails. VLAN2 408b has been configured to use NIC N3 264 as its primary port 286, with NICs N1 260, N2 262 and N4 266 acting as secondary ports 282, 284 and 288 that are transmit only for the team. Secondary ports 282, 284 and 288 also provide fault tolerance in the event of a failure of NIC N3 264. Switch S1 402 is still configured to associate each of the four ports 282, 284, 286 and 288 with both virtual networks as well.

Thus, the team MAC address for VLAN1 408a=E and the team MAC address for VLAN2 408b=G, as indicated by the ARP tables for clients A 452, B 454 (associated with VLAN1 408a) and clients C 456, D 458 (associated with VLAN2 408b). The teaming driver 210 executes the transmit load-balancing algorithm independently for each virtual network team. A user can also independently prioritize the secondary ports for each virtual network team to determine which secondary port will become the next primary port should the first or current primary port fail. It will be apparent to those of skill in the art that the inbound and outbound traffic is more balanced when a different primary can be independently assigned for each virtual network, as well as the fact that a different number of ports can be assigned to each virtual network (not illustrated).

Figure 4D:
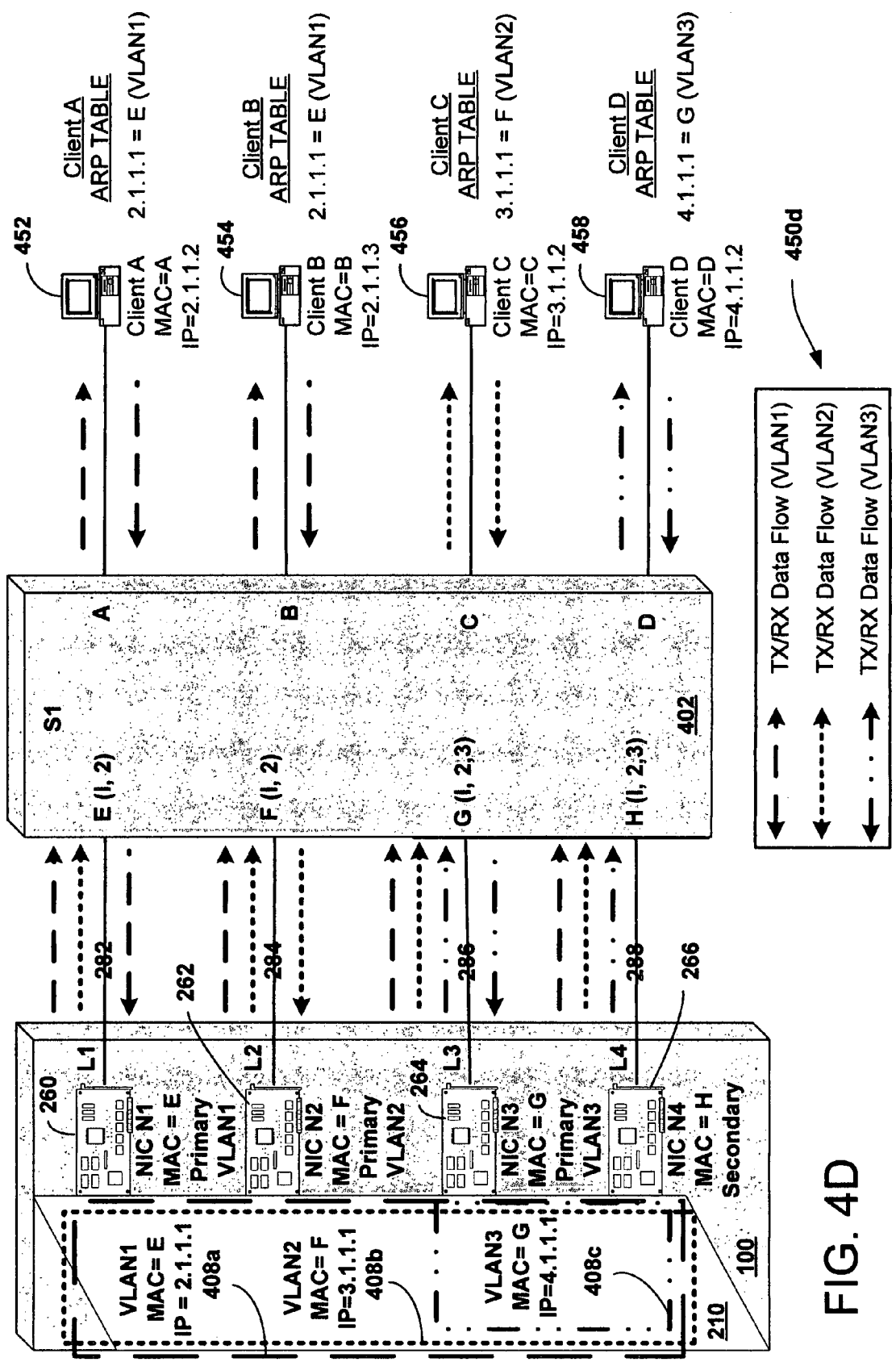
FIG. 4D is a block diagram illustrating the traffic flow over the network for three VLANs each independently configured at the virtual network level to use the network resources of the system of FIG. 2 as a TLB team in accordance with an embodiment of the invention.

FIG. 4D illustrates the traffic flow 450d for the two the virtual networks VLAN1 408a and VLAN2 408b, configured as described above with reference to FIG. 4C, as well as a third virtual network VLAN3 408c. VLAN3 408c is also configured to use team resources as an independent TLB team in accordance with an embodiment of the invention. Client D 458 has now been associated with VLAN3 208c. In this example, VLAN3 408c has been configured to include only NICs N2 262 (assigned as its primary port 284) and N4 266 (assigned to be a secondary port 288). Switch S1 402 has been reconfigured to reflect these port assignments as well. Outbound or transmit traffic for the third virtual network team is load-balanced by teaming driver 210 across ports 284 and 288 and secondary port 288 can provide fault tolerance in the event that its primary port 284 of NIC N2 262 fails.

The team MAC address for VLAN1 408a=E, the team MAC address for VLAN2 408b=G and the team MAC address for VLAN3 408c=F as indicated by the ARP tables for clients A 452, B 454 (associated with VLAN1 408a), client C 456 (associated with VLAN2 408b) and client D 458 (associated with VLAN3 408c). The teaming driver 210 executes the transmit load-balancing algorithm for each virtual network. Again, by creating the teams at the virtual network level, the inbound and outbound traffic is more balanced over the available ports because a different primary port can be configured for each virtual network team.

Figure 5A:
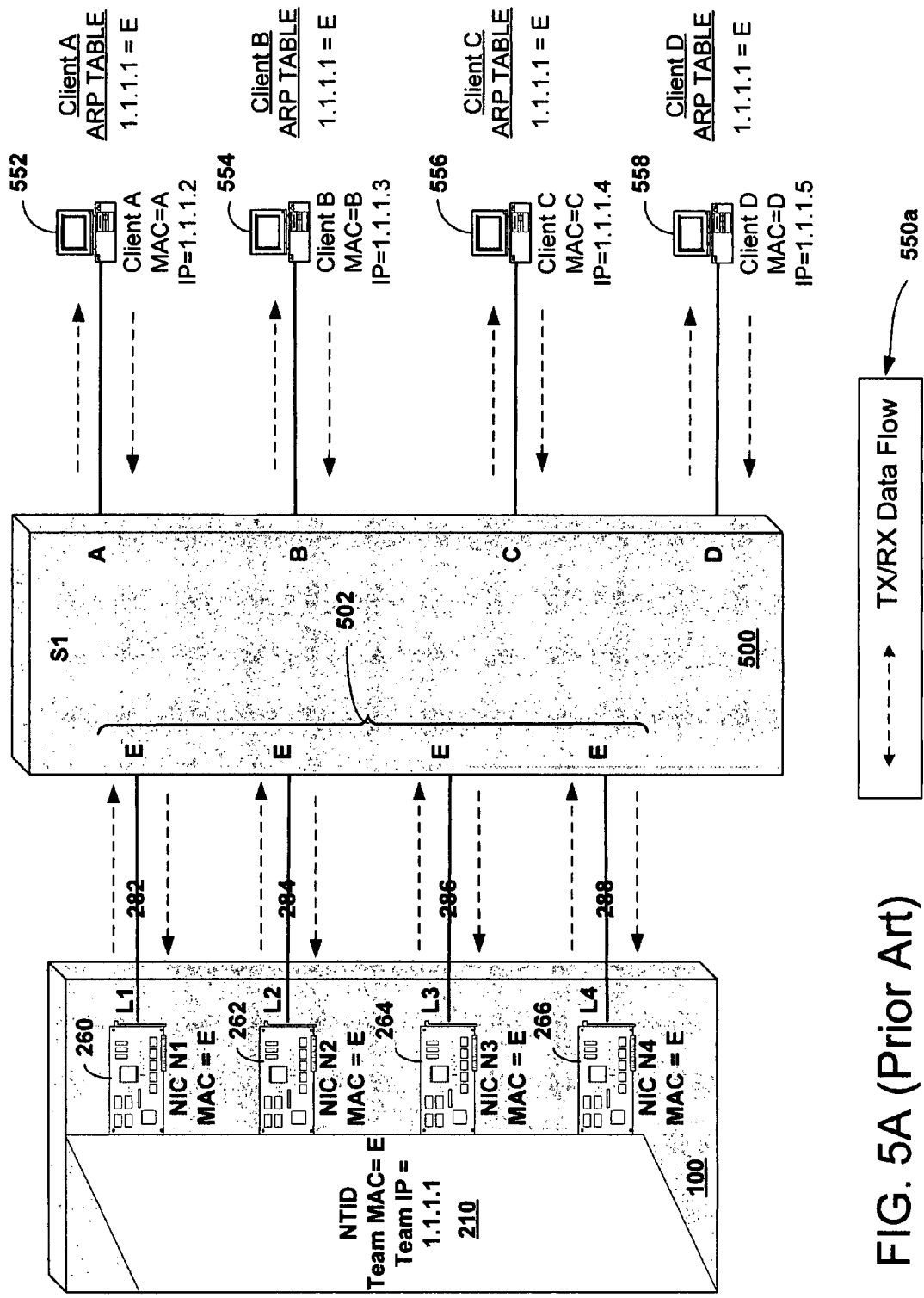
FIG. 5A is a block diagram illustrating the traffic flow over a network for network resources of the system of FIG. 2 configured as an SLB team at the physical level in accordance with the prior art.

FIG. 5A illustrates the traffic flow 550a between the network resources NICs N1 260-N4 268, configured as an SLB team at the physical level in accordance with the prior art, and a network including switch S1 500 through which client devices A 552, B 554, C 556 and D 558 communicate with server 100 and its teamed resources. The MAC address for the team=E and has been assigned to NICs N1 260, N2 262, N3 264 and N4 266. In the case of full load balancing, there is no primary member of the team. The ports 282, 284, 286 and 288 are trunked together as a single port trunk 502 by switch S1 500. In the case of an SLB team, the transmit traffic is load-balanced by teaming driver 210, and the receive traffic is load-balanced by switch S1 500 in accordance with any known port-trunking algorithms (e.g. 802.3ad Link Aggregation Protocol or Cisco's Port Aggregation Protocol). Fault tolerance is provided in that if any of the ports should fail, load balancing will be provided over the remaining active ports. The physical team is seen by the network as a single virtual device as indicated by the single MAC address=E entry for system 100 in the respective ARP tables of client devices A 552, B 554, C 556 and D 558. Those of skill in the art will appreciate that although this MAC address is sometimes referred to herein as the "primary" MAC address for the SLB team, it is not a primary in the same sense as for the teams previously discussed as no one NIC of the team is the primary NIC. However, a MAC address must be assigned to the team and thus is sometimes referred to as the primary MAC address for that reason.

Figure 5B:
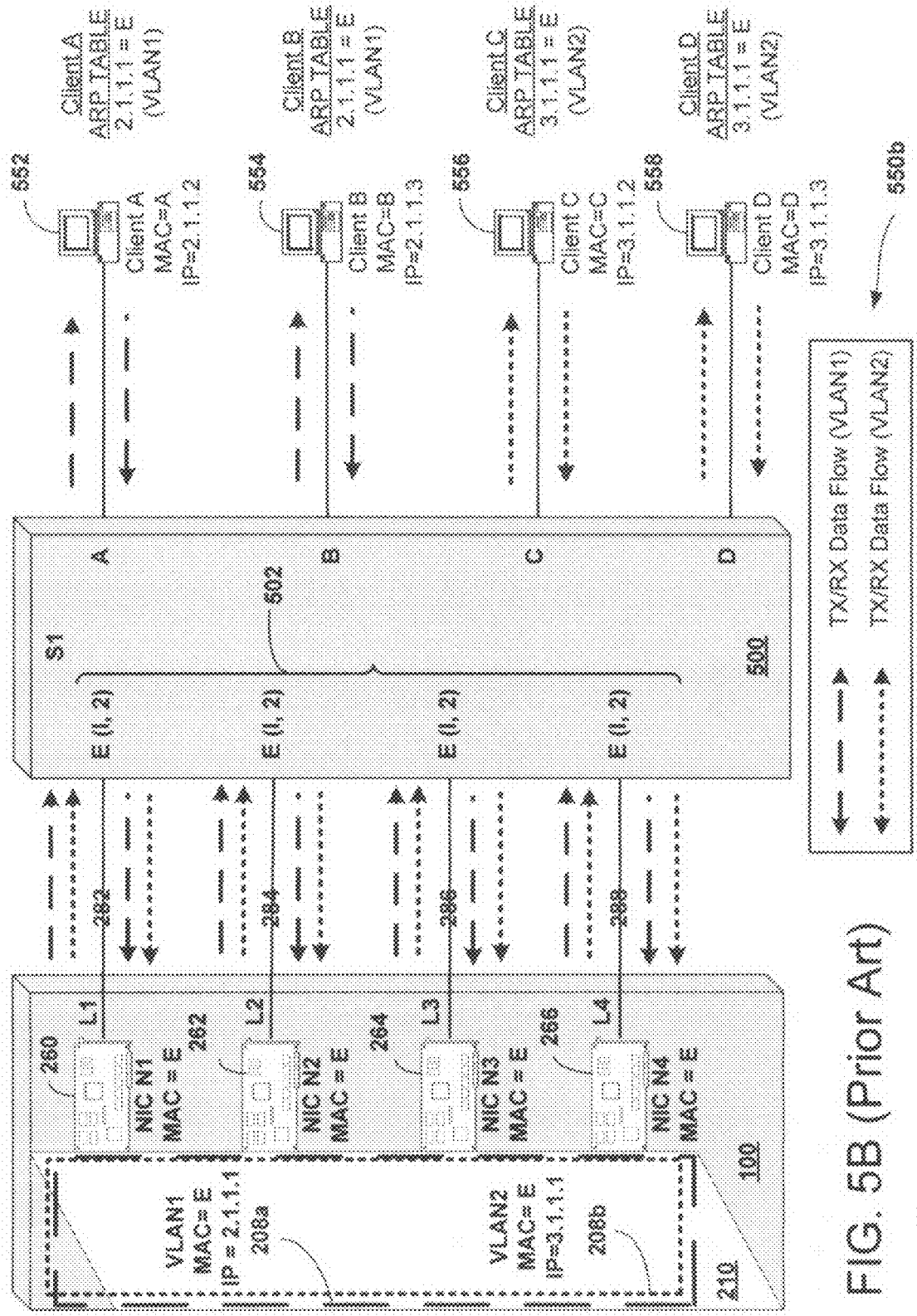
FIG. 5B is a block diagram illustrating the traffic flow over the network for the SLB team of FIG. 5A with two VLANs configured over the physical team in accordance with the prior art.

FIG. 5B illustrates traffic flow 550*b* for virtual networks VLAN1 208*a* and VLAN2 208*b*, configured over the physical SLB team of FIG. 5A in accordance with the prior art. As illustrated, virtual networks VLAN1 208*a* and VLAN2 208*b* are each configured to communicate with the clients A 552, B 554 (members of VLAN1 208*a*) and clients C 556, D 458 (members of VLAN2 208*b*) through network switch S1 500. Each virtual network is configured to include all four teamed NICs N1 260, N2 262, N3 264 and N4 266, providing ports 282, 284, 286 and 288 respectively. The switch S1 500 has also been appropriately configured for this port assignment as illustrated.

As previously discussed, virtual networks configured over network resources teamed at the physical level in accordance with the prior art were constrained to use the team as configured at the physical level. As a result, both virtual networks are required to use the entire trunked port 502 as their primary port. Thus, all receive traffic (i.e. inbound network traffic) for all virtual networks configured over the physical team must be load-balanced by switch S1 500 to all of the NICs of the team as illustrated. Likewise, the transmit traffic must be load-balanced to all four ports for both virtual networks. This is so notwithstanding that one of the virtual networks may not require as much traffic handling bandwidth as the other.

Figure 5C:
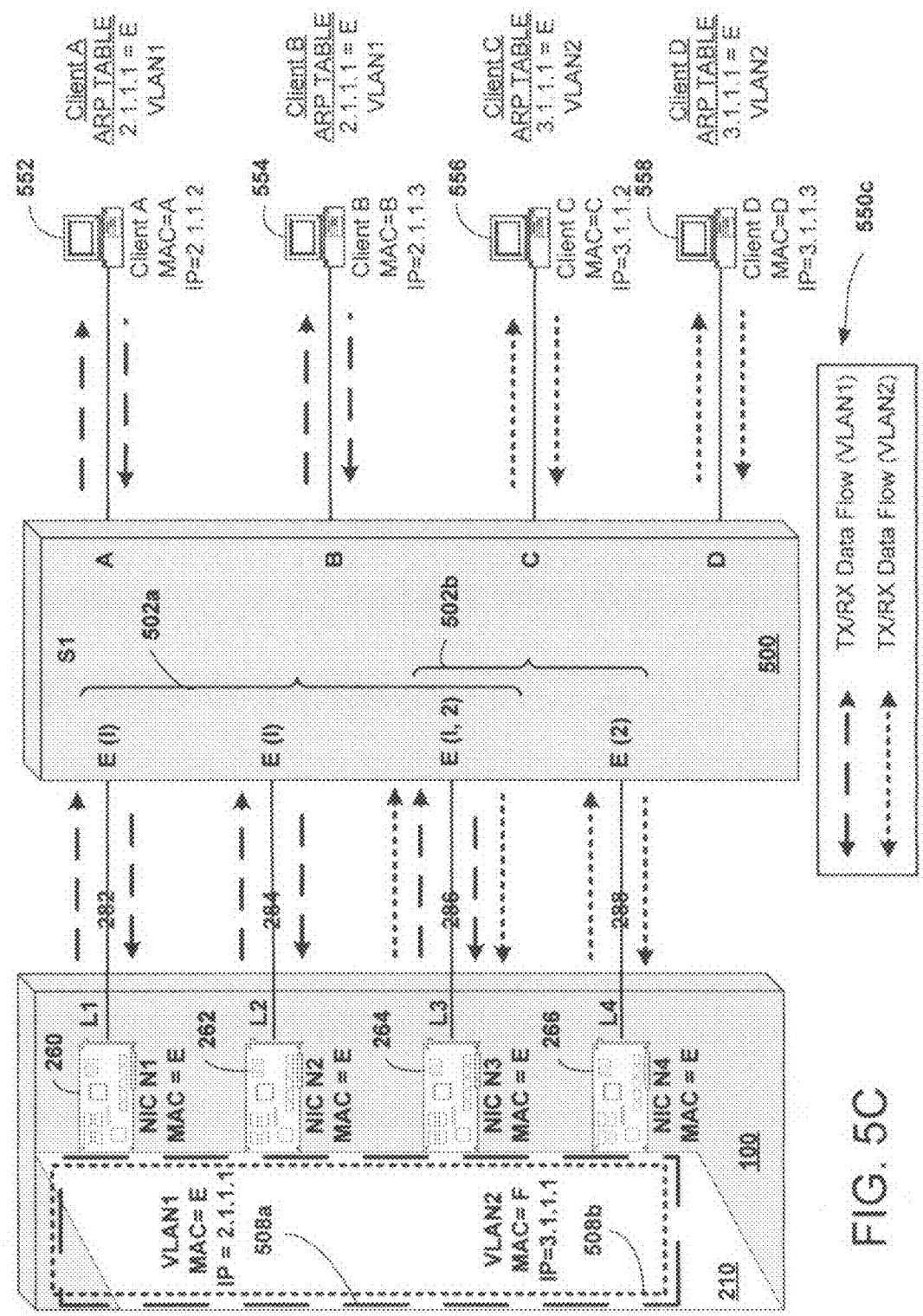
FIG. 5C is a block diagram illustrating the traffic flow over the network for two VLANs each independently configured at the virtual network level to use the network resources of the system of FIG. 2 as an SLB team in accordance with an embodiment of the invention.

FIG. 5C illustrates the traffic flow 550*c* for two virtual networks VLAN1 508*a* and VLAN2 508*b*, which have been configured in accordance with an embodiment of the invention. In this example, the ports of switch 500 have been independently aggregated for each virtual network on a per VLAN basis. Thus, ports 282, 284, 286 have been grouped to create a first aggregation group 502*a*, and ports 286 and 288 are grouped to create a second aggregation group 502*b*. Thus, teaming driver 210 transmit load balances outbound data independently for each virtual network over only the ports assigned to each of the virtual networks, and the switch 500 load balances inbound data only over the ports independently aggregated for each virtual network. It will be appreciated that bandwidth can be better allocated between the virtual networks in accordance with predicted or actual traffic demands if the ports are aggregated independently for each virtual network. For example, if each of the four NICs N1 260, N2 262, N3 264 and N4 266 have a capacity of one Gigabit per second, VLAN1 508*a* has a transmit and receive bandwidth of three Gigabits per second and VLAN2 508*b* has an available bandwidth of two Gigabits per second, rather than each virtual network being forced to utilize four Gigabits per second as in FIG. 5B. Detailed embodiments implementing the aggregation of switch ports on a per virtual network basis are disclosed in U.S. patent application Ser. No. 11/468,442, filed Aug. 30, 2006, entitled "A Method And System of Implementing Virtual Local Area Networks (VLANS) with Teamed Communication Ports," which is incorporated herein by this reference.

Figure 5D:
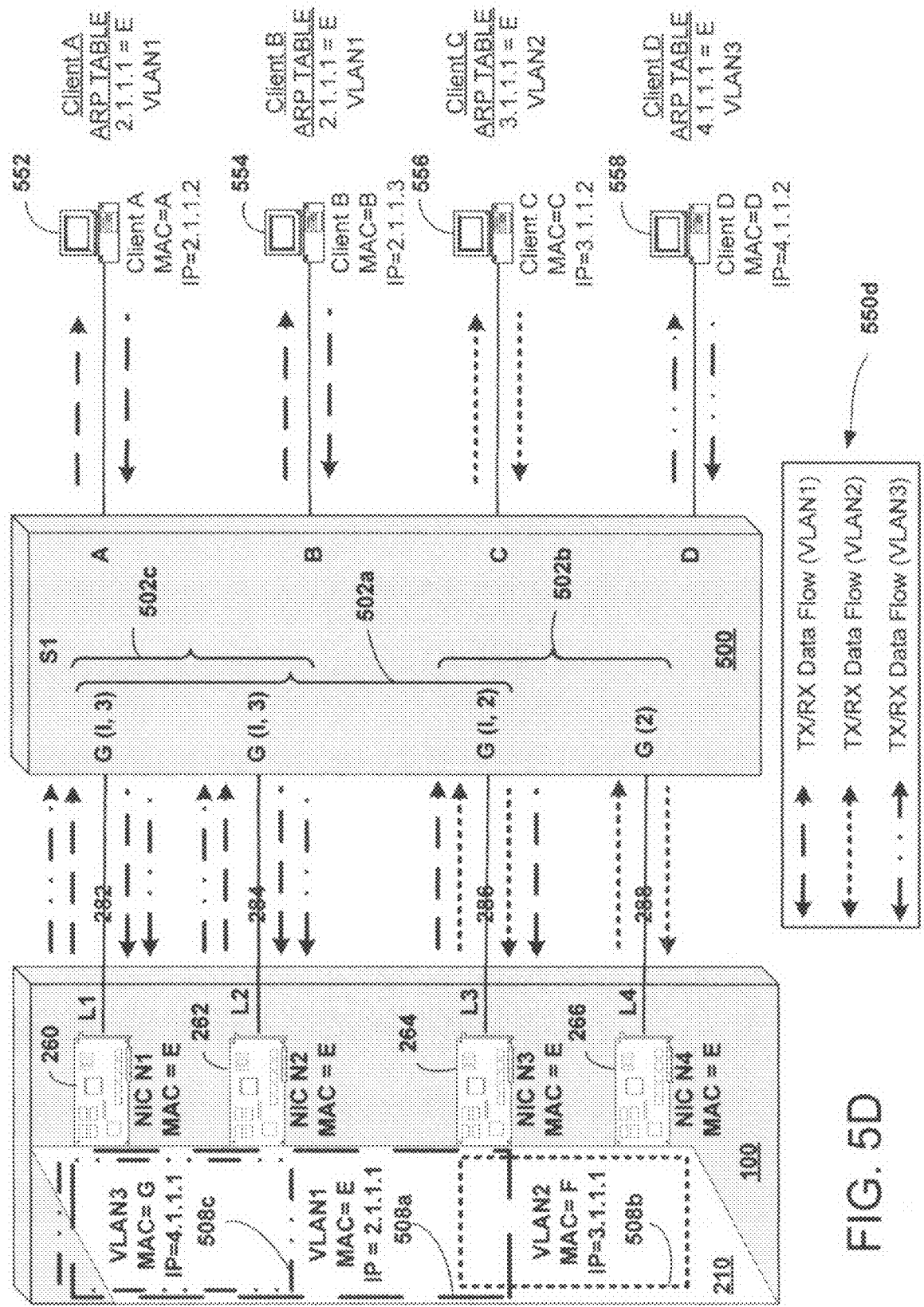
FIG. 5D is a block diagram illustrating the traffic flow over the network for three VLANs each independently configured at the virtual network level to use the network resources of the system of FIG. 2 as an SLB team in accordance with an embodiment of the invention.

FIG. 5D illustrates the traffic flow SSOd for the two the virtual networks VLAN1 508*a* and VLAN2 508*b*, configured as described above with reference to FIG. 5C, as well as a third virtual network VLAN3 508*c*. In this example, the ports of switch S1 500 have been independently aggregated for all three virtual networks on a per VLAN basis. Thus, ports 282, 284, 286 have been grouped to create a first aggregation group 502*a* for use by VLAN1 508*a*, ports 286 and 288 are grouped to create a second aggregation group 502*b* for VLAN2 508*b*, and ports 282 and 284 are grouped to create a third aggregation group 502*c* for use by VLAN3 508*c*. Thus, teaming driver 210 transmit load balances outbound data over the ports assigned to each of the virtual networks, and the switch S1 500 load balances inbound data over the ports aggregated for each virtual network. It will be appreciated that bandwidth can be better allocated between the virtual networks in accordance with predicted or actual traffic demands if the ports are aggregated independently for each virtual network. In this example, if each of the four NICs N1 260, N2 262, N3 264 and N4 266 have a capacity of one Gigabit per second, VLAN1 508*a* has a transmit and receive bandwidth of three Gigabits per second, VLAN2 508*b* has an available transmit and receive bandwidth of two Gigabits per second and VLAN3 508*c* has an available transmit and receive bandwidth of two Gigabits per second, rather than each virtual network being forced to utilize four Gigabits per second as in FIG. 5B.

Figure 6A:
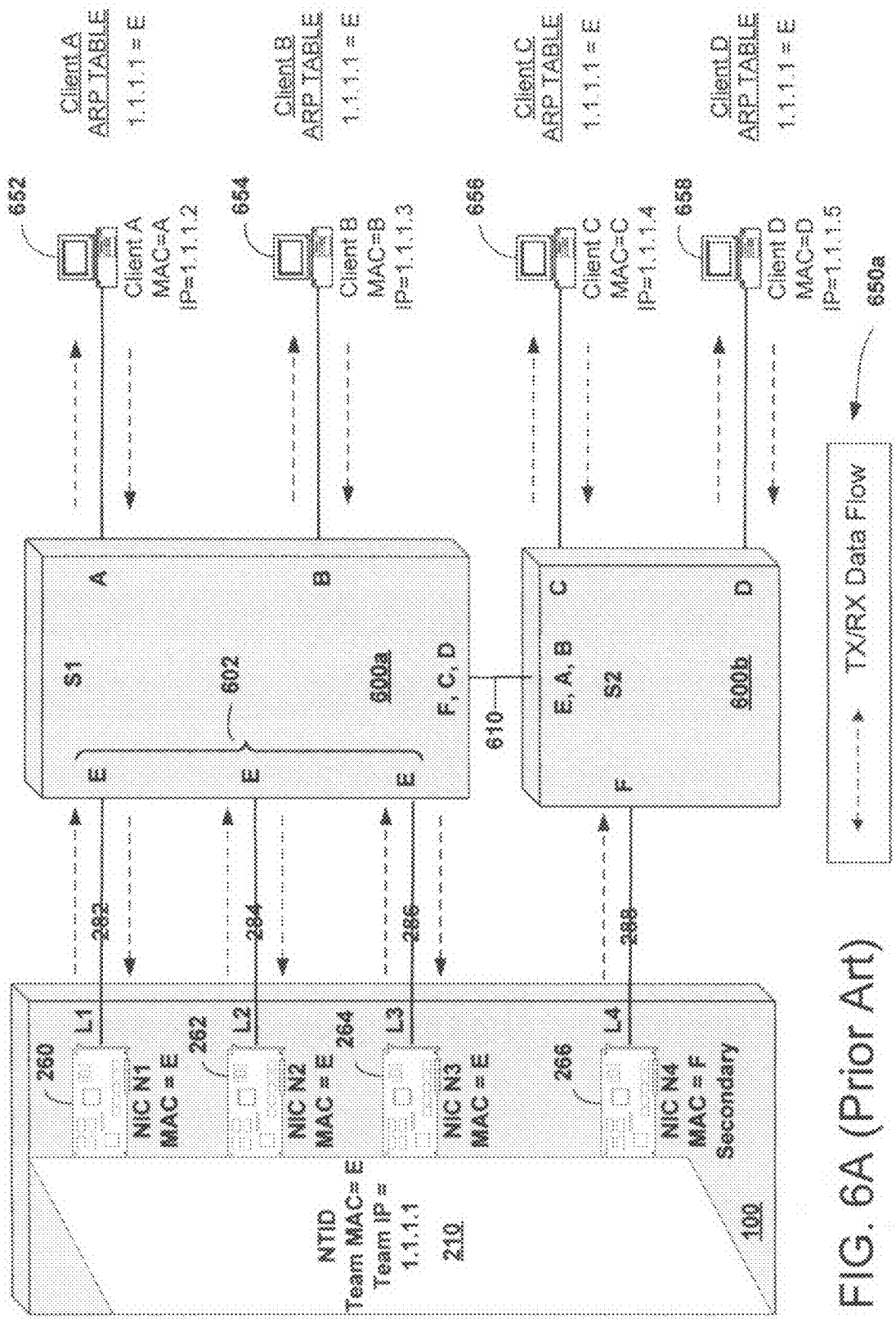
FIG. 6A is a block diagram illustrating the traffic flow over a network for network resources of the system of FIG. 2 configured as a channel-based TLB team at the physical level in accordance with the prior art.

FIG. 6A illustrates the traffic flow 650*a* for a channel-based TLB team configured at the physical level as is known the art. In this teaming case, the ports 282, 284, and 286 of NICs N1 260, N2 262 and N3 264 respectively are combined into a single channel through switch S1 600*a*. Switch S1 600*a* is configured to create port trunk 602 through known techniques to load balance inbound or receive data from the network over all three NIC ports 282, 284 and 286. Switch redundancy is provided for the team with port 288 of NIC N4 266 coupled to Switch S2 600*b*. In this teaming case, the primary port for the team is the entire port channel 602 having a MAC address=E, as indicated by the ARP tables for clients A 652, B 654, C 656 and client D 658. NIC N4 266 acts as a secondary for the team and transmits only. It will be appreciated that because both switches S1 600*a* and S2 600*b* are ultimately coupled to a common core network through a network device such as a core switch (not shown), inbound traffic received from clients C 656 and D 658 can be returned to the primary channel through the core switch and switch S1 600*a*, or through switch S2 600*b* and the switch cross-connect 610.

Thus, the channel based TLB team of FIG. 6A behaves like a conventional TLB team (FIG. 4A), except it has a group of trunked NIC ports 602 that have been aggregated for full load balancing through a trunking-enabled switch S1 600*a* in the same way as the SLB team of FIG. 5A is configured for full load-balancing. In this way, the trunked group of ports 282, 284 and 286 can behave as an aggregated single primary port 602 for the TLB team. The transmit or outbound data is load balanced between the trunked port 602 and the secondary port 288 provided by NIC N4 264 using a transmit load-balancing algorithm implemented by teaming driver 210. Both the receive load balancing algorithm implemented by switch S1 600*a* and the transmit load-balancing algorithm implemented by the teaming driver 210 can be any currently known algorithm currently known or one developed in the future. For more additional information regarding channel-based TLB teaming, please refer to the above-referenced U.S. patent application Ser. No. 11/208,689.

Figure 6B:
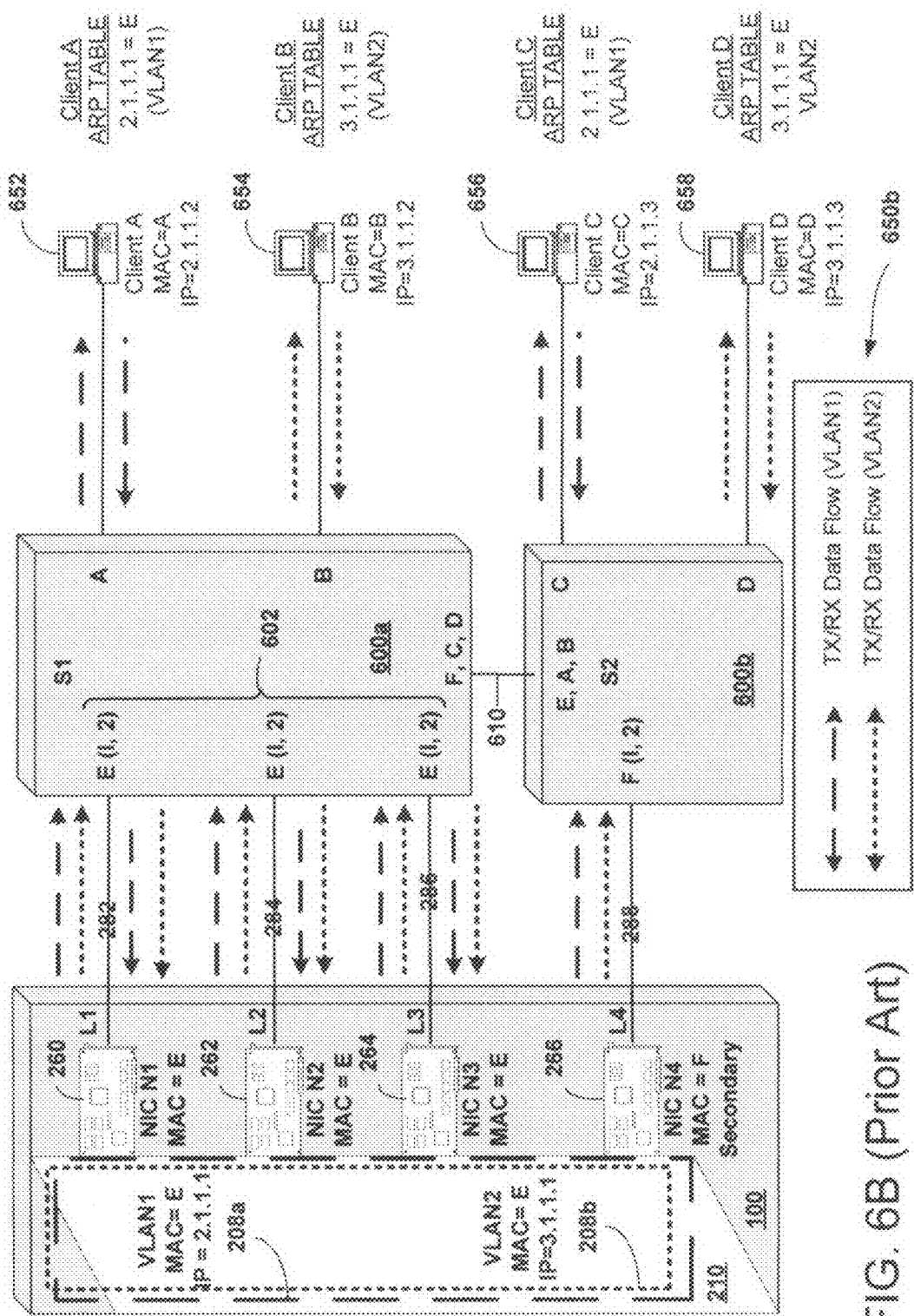
FIG. 6B is a block diagram illustrating the traffic flow over the network for the channel-based TLB team of FIG. 6A with two VLANs configured over the physical team in accordance with the prior art.

FIG. 6B illustrates the traffic flow 650*b* for two virtual networks VLAN1 208*a* and VLAN2 208*b* implemented over the physically configured channel-based TLB team of FIG. 6A in accordance with the prior art. Both virtual networks are configured to use all four ports 282, 284, 286 and 288 and redundant switches S1 600*a* and S2 600*b* have been configured for this port assignment as illustrated. As will be appreciated, both virtual networks are constrained to use the aggregate channel of trunked ports 282, 284, 286 and NICs N1260, N2 262 and N3 264 as their primary port 602, and port 288 of NIC N4 266 as their secondary "transmit only" resource.

Thus, the team MAC address for both VLAN1 208*a* and VLAN2 208*b*=E and the as indicated by the ARP tables for clients A 652, B 654 (associated with VLAN1 208*a*) and clients C 656, D 658 (associated with VLAN2 208*b*). Outbound traffic for both virtual networks is commonly load-balanced by teaming driver 210 across all four ports, and all inbound traffic is received through the primary port trunk 602 and load-balanced by switch S1 600*a* to ports 282, 284 and 286. As previously mentioned, the inbound data from clients C 656 and D 658 can be returned to the primary channel (MAC=E) either through a common core network (not shown) and switch S1 600*a*, or through redundant switch S2 600*b* and the switch cross-connect 610.

Figure 6C:
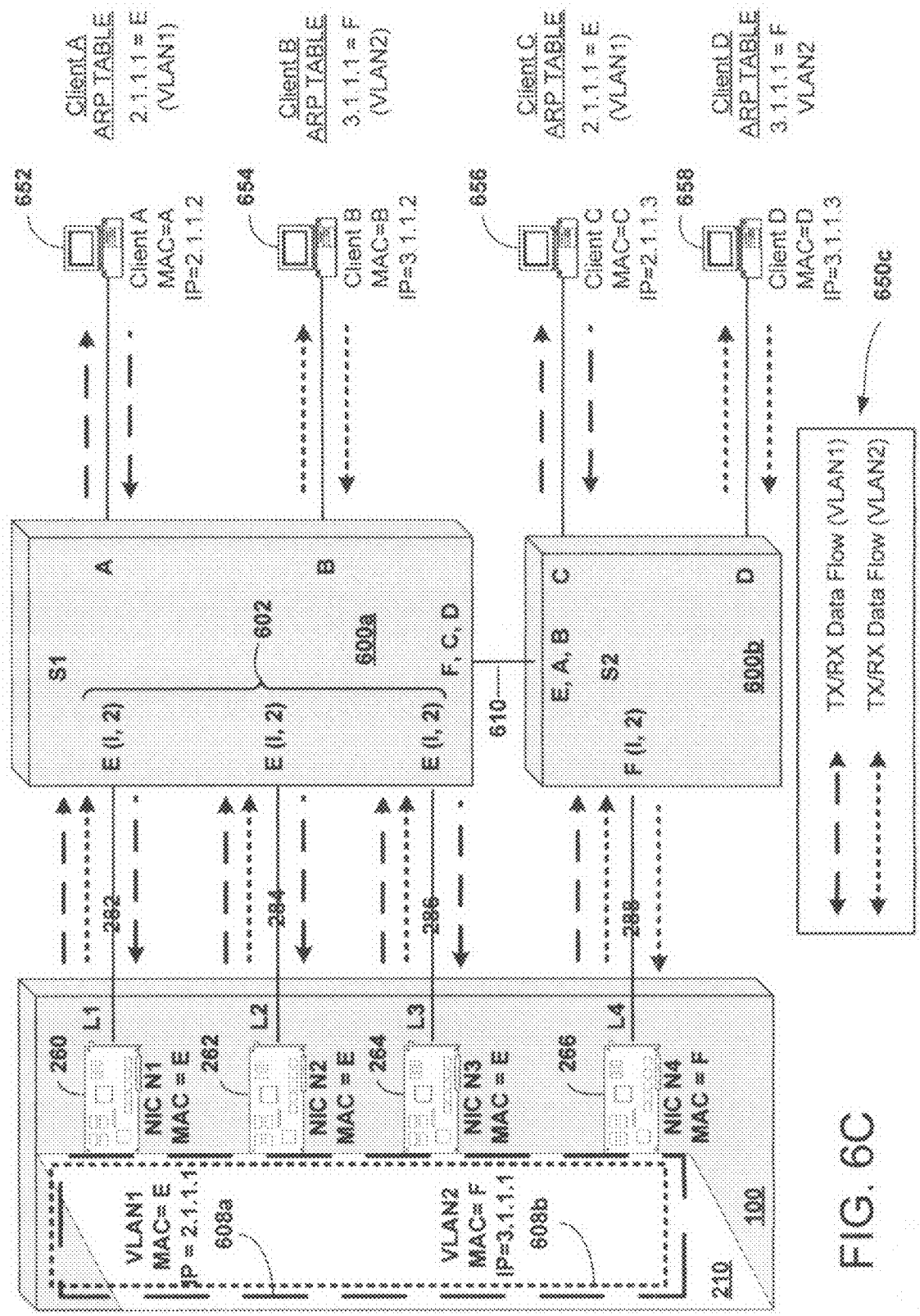
FIG. 6C is a block diagram illustrating the traffic flow over the network for two VLANs each independently configured at the virtual network level to use the network resources of the system of FIG. 2 as a channel-based TLB team in accordance with an embodiment of the invention.

FIG. 6C illustrates the traffic flow 650*c* for the two virtual networks VLAN1 608*a* and VLAN2 608*b*, each configured as independent TLB teams in accordance with an embodiment of the invention. In this example, each virtual network has been configured to include all of the available ports 282, 284, 286 and 288 of NICS 260, 262, 264 and 266 respectively as a TLB team, but with each virtual network having its own independently assigned primary port. The resources have been configured for VLAN1 608*a* as a channel-based TLB team with trunk port 602 assigned as the primary and port 288 of NIC N4 266 as a "transmit only" secondary port, as was the case for VLAN 208*a* of FIG. 6B. The resources have been configured for VLAN2 608*b* with port 288 of NIC N4 266 assigned as its primary, and ports 282, 284, 286 of NICs N1 260, N2 262 and N3 264 respectively as secondary transmit only ports (ports 282, 284 and 286 are trunked only on the receive side).

Thus, the team MAC address for VLAN1 608*a*=E and the team MAC address for VLAN2 608*b*=F, as indicated by the ARP tables for clients A 652, C 656 (associated with VLAN1 608*a*) and clients B 654, D 658 (associated with VLAN2 608*b*). As will be appreciated, teaming the resources on a per virtual network basis as illustrated provides more flexibility in balancing both transmit and receive traffic for the available network resources. The inbound traffic from client B 654 (VLAN2 608*b*) can be returned to the primary port 288 for VLAN2 608*b* (MAC=F) either through a common core network (not shown) and switch S2 600*b*, or through redundant switch S1 600*a* and the switch cross-connect 610. Likewise, inbound traffic from client C 656 (VLAN1 608*a*) can be returned to the primary port 602 for VLAN1 608*b* (NAC=E), either through a network device coupling both virtual networks to a common core network (not shown) and switch S1 600*a*, or through redundant switch S2 600*b* and the switch cross-connect 610.

Figure 7A:
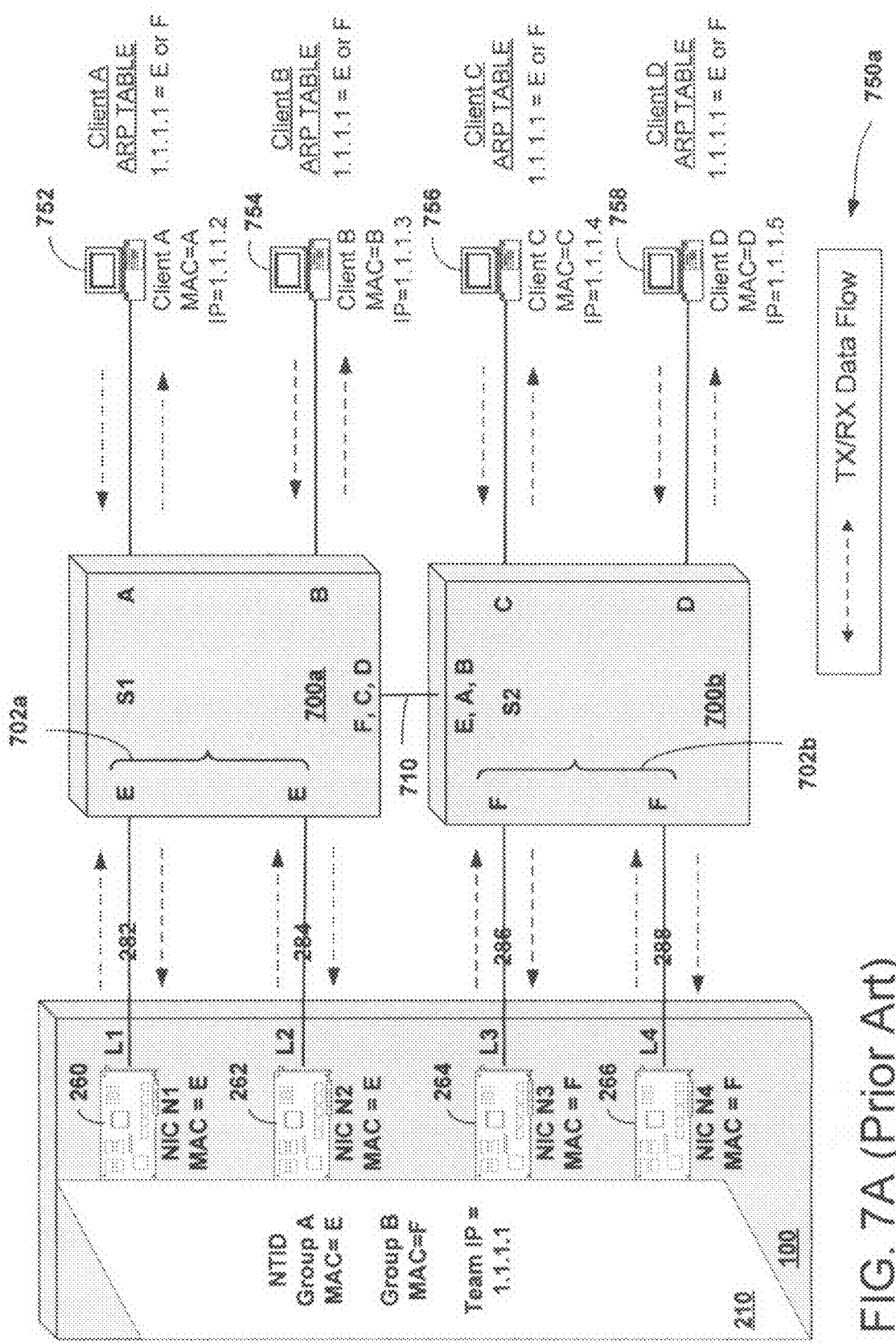
FIG. 7A is a block diagram illustrating the traffic flow over a network for network resources of the system of FIG. 2 configured as a dual channel team at the physical level in accordance with the prior art.

FIG. 7A illustrates the traffic flow 750*a* for a Dual Channel team configured at the physical level as is known in the art. In this teaming case, the ports 282, 284 of NICs N1 260, N2 262 respectively are aggregated into a single channel as a port trunk 702*a* using switch S1 700*a*. Ports 286, 288 of NICs N3 264 and N4 266 are combined into a single channel as port trunk 702*b* through switch S2 700*b*. Switches S1 700*a* and S2 700*b* are configured to create port trunks 702*a* and 702*b* and to load balance receive traffic across the ports of each port trunk using known techniques as previously discussed. Moreover, receive traffic is further load balanced across the two switches for this teaming case by providing two different MAC addresses to the clients A 752, B 754, C 756 and client D 758 of the network. Thus, the primary port for the team can be either the MAC address assigned to port channel 702*a* (MAC address=E) or the MAC address assigned to port channel 702*b* (MAC address=F), as indicated by the ARP tables for clients A 752, B 754, C 756 and client D 758. Those of skill in the art will appreciate that the MAC address is provided by the teaming driver 210 as either E or F during ARP requests issued by the clients A 752, B 754, C 756 and client D 758. This process is sometimes referred to as ARP intercept where the teaming driver 210 can provide either MAC address to a requesting client based on an algorithm designed to balance the traffic between switches 700*a* and 700*b*.

Figure 7B:
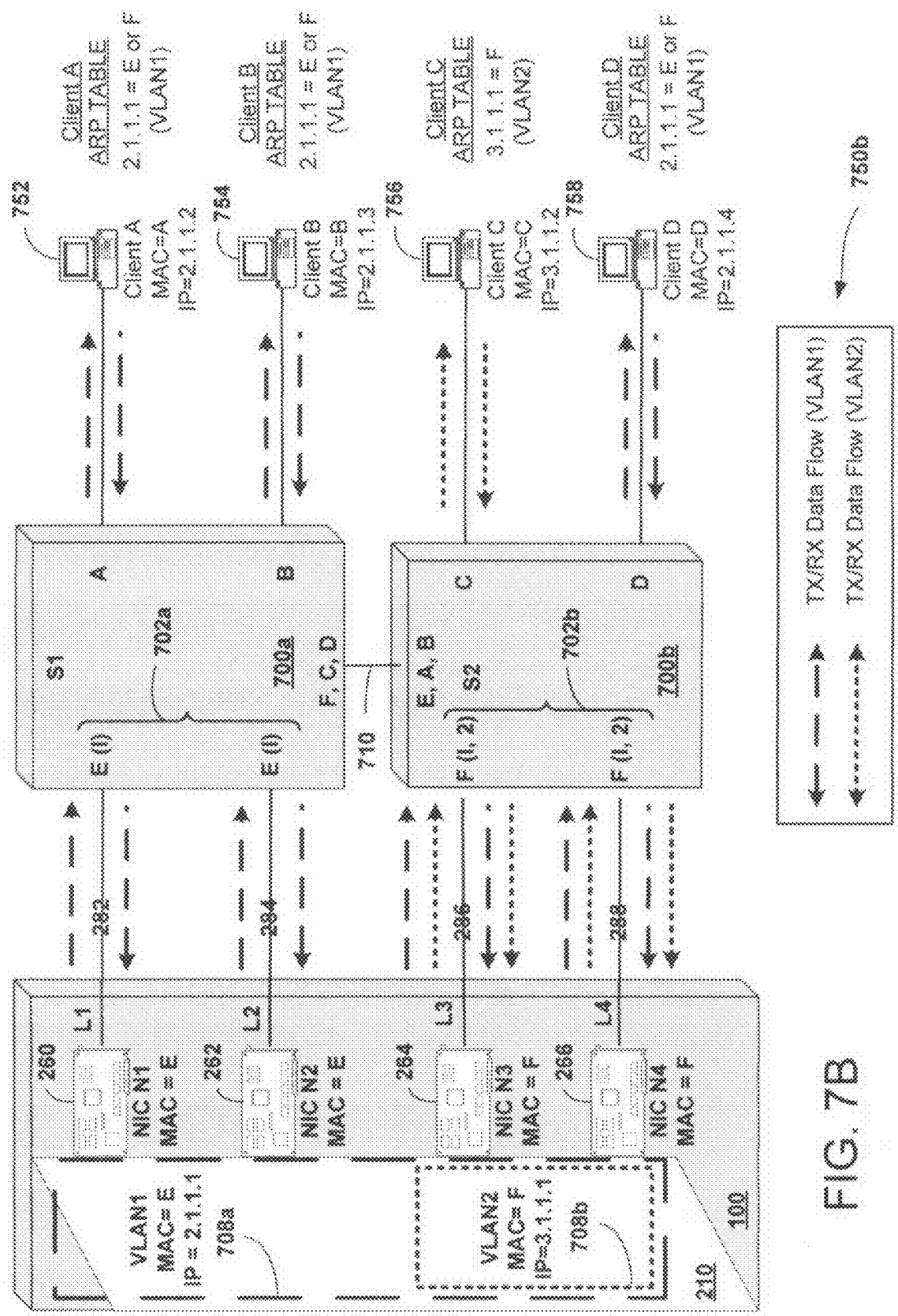
FIG. 7B is a block diagram illustrating the traffic flow over the network for two VLANs each independently configured at the virtual network level to use the network resources of the system of FIG. 2 as a dual channel team (VLAN1) and an SLB team (VLAN2) in accordance with an embodiment of the invention.

Those of skill in the art will appreciate that any virtual networks configured over the physical dual channel team in accordance with the prior art will require that each virtual network use the team in its dual-channel configuration. This may be true notwithstanding that not all of the virtual networks require the full load balancing of its traffic over all of the available ports. FIG. 7B illustrates the independent configuration of two virtual networks in accordance with an embodiment of the invention on a per virtual network basis. In this example, virtual network VLAN1 708*a* is independently configured to use all of the available ports 282, 284, 286 and 288 of NICs 260, 262, 264 and 266 respectively as a dual channel team, with a team MAC address that be either E or F as described above. Virtual network VLAN2 708*b* has been independently configured to use only ports 286 and 288 of NICs 264 and 266 respectively as an SLB team. Thus, the MAC address=F only for the SLB team of VLAN2 708*b*. Switches S1 700*a* and 700*b* are also programmed to associate each of the ports with all virtual networks to which they are assigned as illustrated.

In this example, clients A 752, B 754 and D 758 are associated with VLAN1 708*a* and client C 756 is associated with VLAN2 708*b*, as indicated by their respective ARP tables. As previously mentioned with reference to previous examples employing redundant switching topologies, the resources of the entire team are ultimately coupled to a common network device, such as a core network switch that couples system 100 to a core network (not shown). Thus, inbound traffic to system 100 from clients A 752 and B 754 when they are provided a MAC address for the team=F can be received through switch S2 700*b* via the core network or through switch S2 700*b* via switch S1 700*a* and cross-couple 710. Likewise, inbound traffic to system 100 from client D 758 when it is provided with a team MAC address=E can be received through switch S1 700*a* via the core network or through switch S1 700*a* via switch 700*b* and cross-couple 710. Those of skill in the art will appreciate that the transmit and receive bandwidth of the available resources can be once again more flexibly allocated by configuring the resources on a per virtual network basis as described, rather than constraining all virtual networks to a single physical configuration of the available ports of the available resources.

Figure 8:
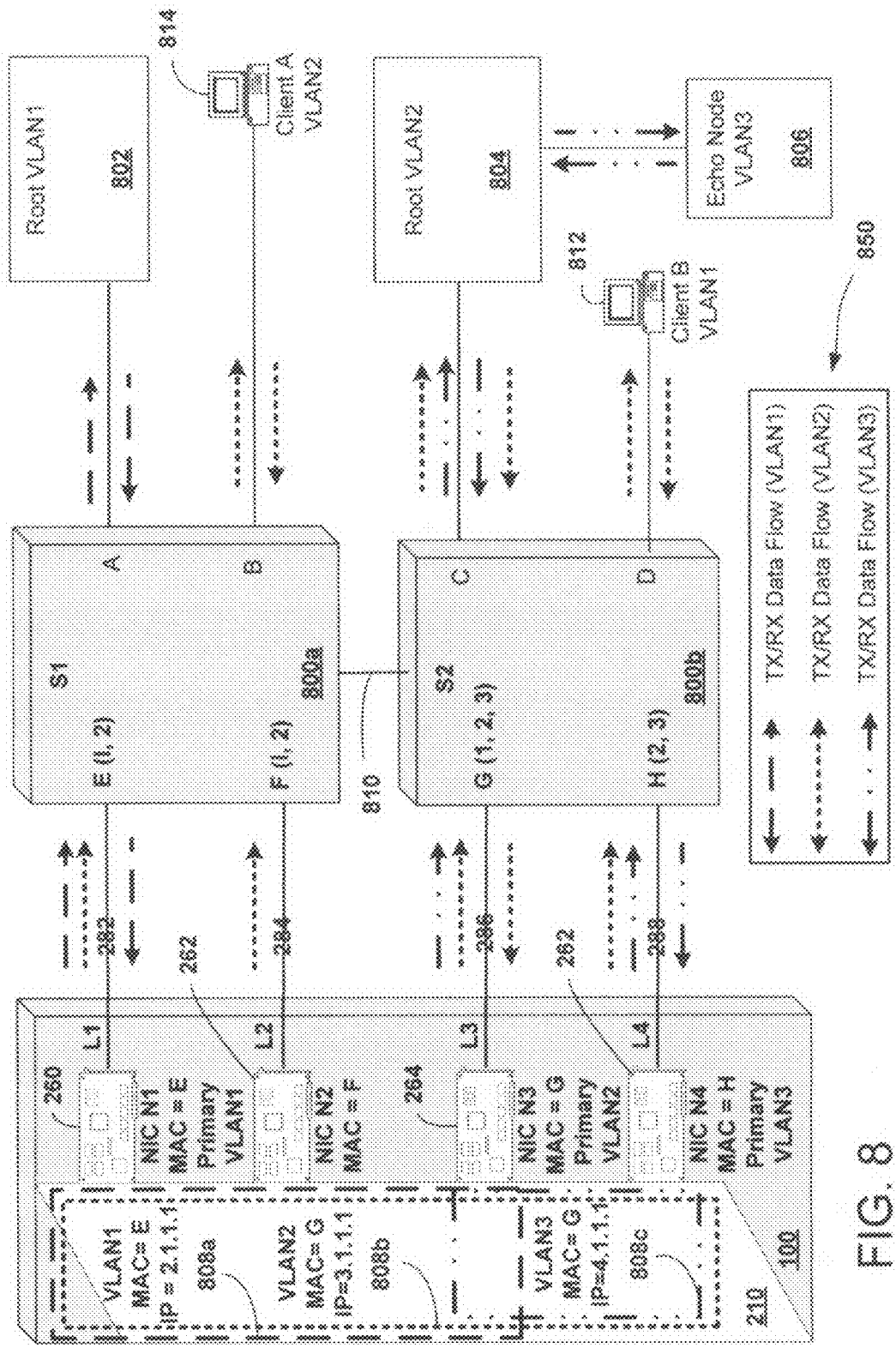
FIG. 8 is a block diagram illustrating the traffic flow over the network for three VLANs each independently configured at the virtual network level such that primary resources are assigned that are optimal for advanced teaming techniques, the configuration on a per VLAN basis in accordance with an embodiment of the invention.

FIG. 8 illustrates the computer system 100 coupled to a switch redundant network topology in which the advanced teaming techniques of Fast Path and Active Path are employed. In this example, three virtual networks have been configured to use the available resources independently on a per virtual network basis in accordance with an embodiment of the invention. VLAN1 808*a* has been configured to use ports 282, 284 and 286 provided by NICs N1 260, N2 262 and N3 264 respectively as an NFT team. Port 282 provided by NIC N1 260 has been assigned as the primary port for the team, and thus the MAC address for the team for members of VLAN1 808*a* is E. NICs N2 262 and N3 264 are designated as the secondary resources for the team and remain on "standby" for the team until a failure of NIC N1 260 and port 282 is detected. Switches S1 800*a* and S2 800*b* are also programmed to associate ports 282, 284 and 286 with VLAN1 808*a* as illustrated. The NFT team of VLAN1 808*a* is also configured to provide Fast Path functionality for the team. The ability to provide a primary port independently for each virtual network ensures that the primary port for VLAN1 808*a* can be associated with the lowest cost path for that virtual network as indicated by root switch 802.

VLAN2 808*b* has been configured to use all four NICs N1 260, N2 262, N3 264 and N4 266 as a TLB team. Switches S1 and S2 have also been programmed to associate all four ports 282, 284, 286 and 288 with VLAN2 808*b* as illustrated. The role of primary port for the TLB team of VLAN2 808*b* has been assigned to port 286 provided by NIC N3 264. Thus, the MAC address for the team for members of VLAN2 808*b* is MAC=G. The TLB team for VLAN2 808*b* has also been configured for Fast Path, with the lowest cost path for the virtual network indicated by root switch 804. It will be apparent to those of skill in the art that the ability to provide a primary port independently for each virtual network ensures that the primary port for VLAN2 808*b* can be associated with the lowest cost path for that virtual network as indicated by root switch 804.

VLAN3 808*c* has been configured to use NICs N3 264 and N4 266 as a TLB team. Switch S2 has also been programmed to associate ports 286 and 288 with VLAN3 808*c* as illustrated. The role of primary port for the TLB team of VLAN3 808*c* has been assigned to port 288 provided by NIC N4 266. Thus, the MAC address for the team for members of VLAN3 808*c* is MAC=H. The TLB team for VLAN3 808*c* has also been configured for Active Path wherein the echo node 806 which provides response frames for connectivity verification is coupled to root switch 804. It will be apparent to those of skill in the art that the ability to provide a primary port independently for each virtual network ensures that the primary port for VLAN3 808*c* can be associated with a path that will most directly provide verification frames from the echo node 806.

Figure 9A:
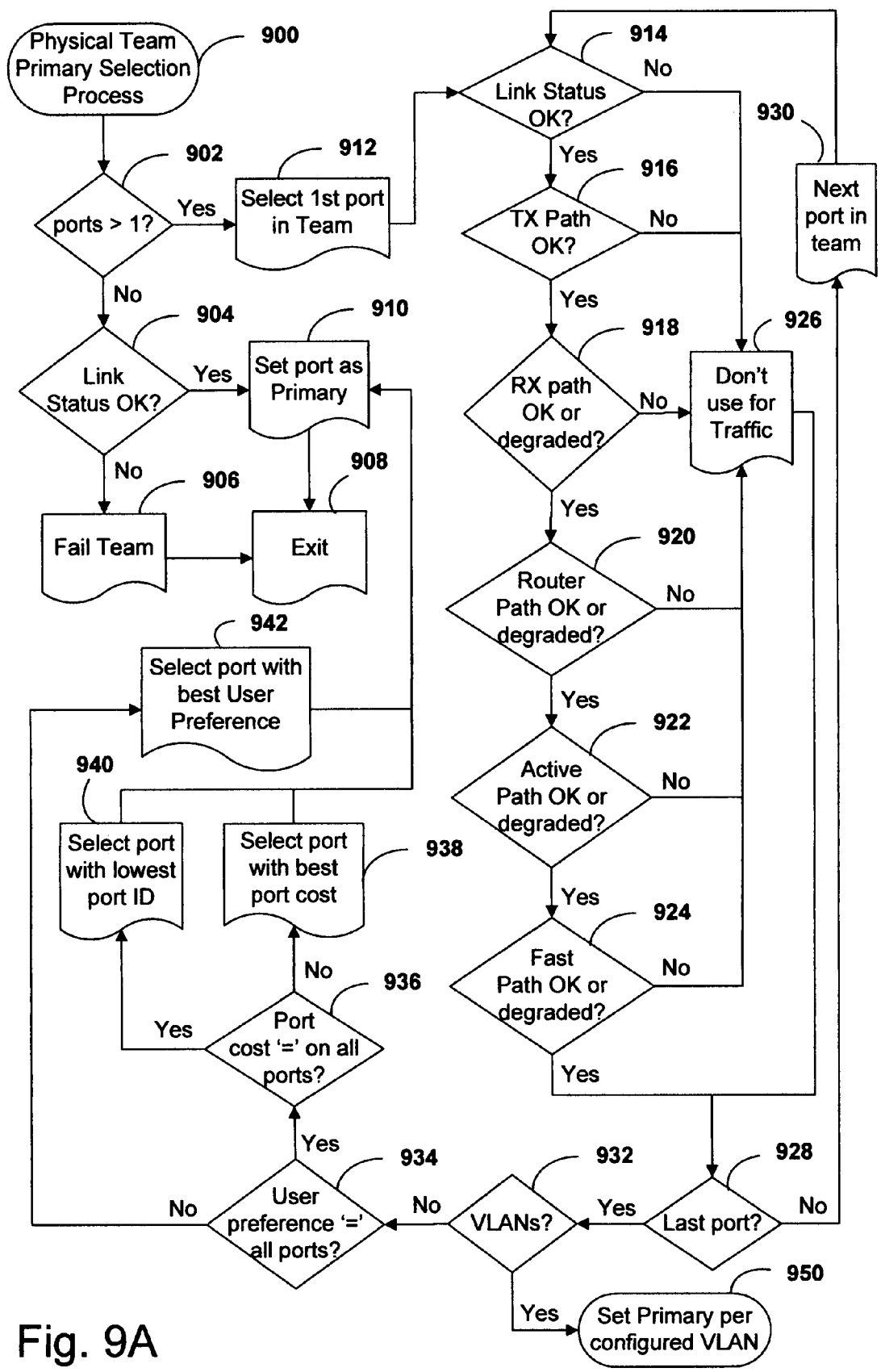
FIGS. 9A-C illustrate a procedural flow diagram describing an automated process for assigning primary NICs on a per VLAN basis in accordance with an embodiment of the invention.
Figure 9B:
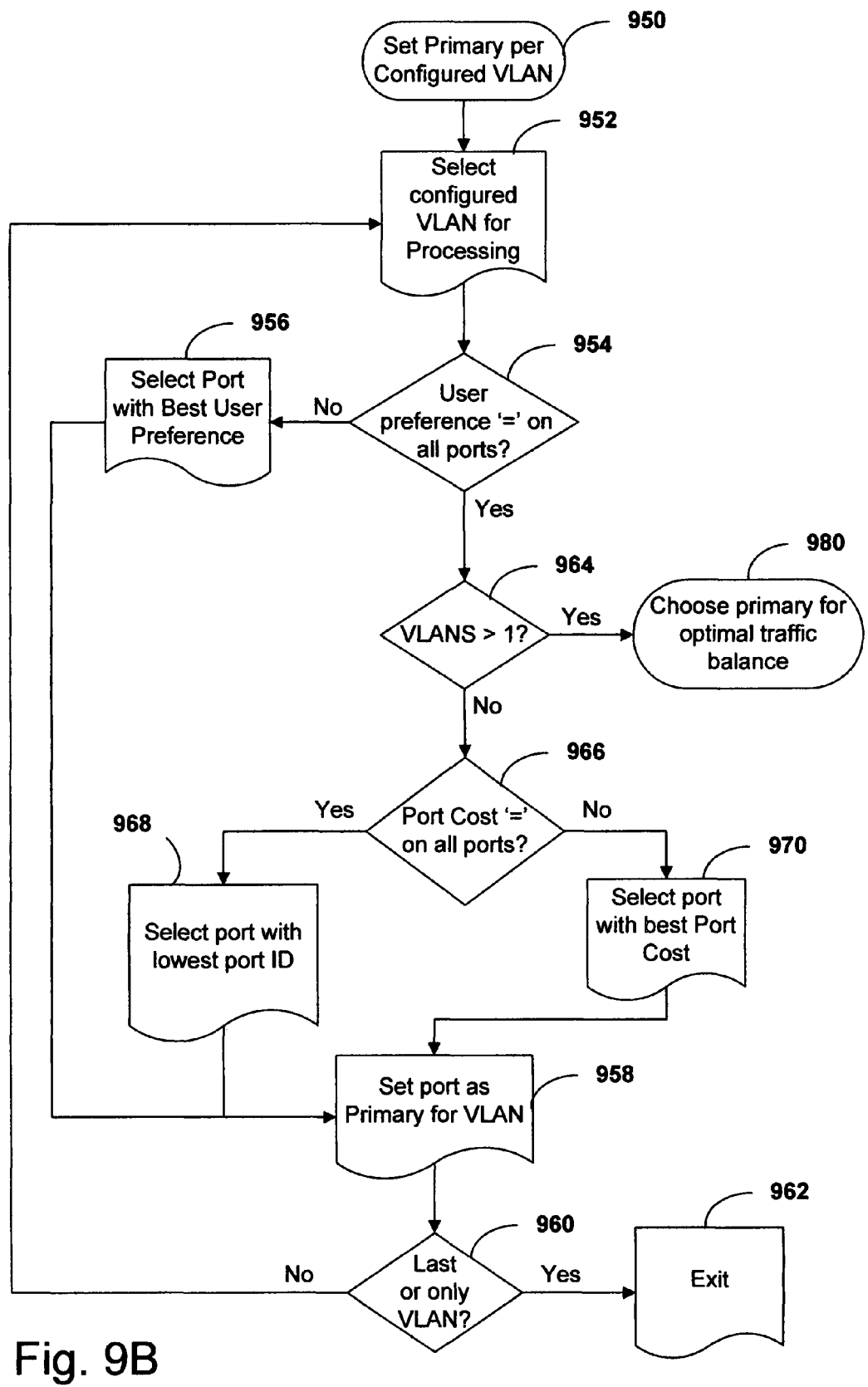
Figure 9C:
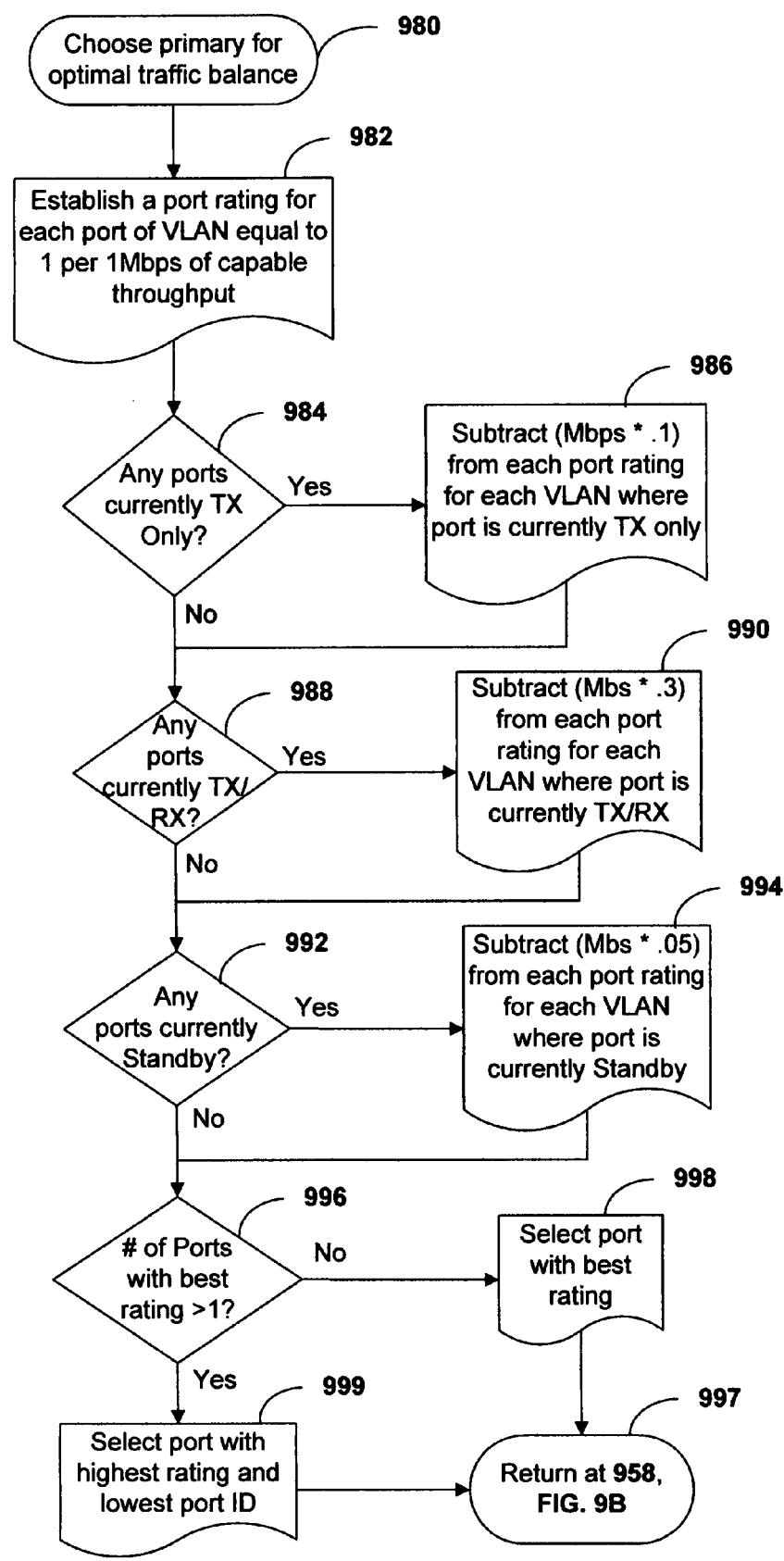

A more detailed discussion of how primary ports may be chosen and assigned on a per virtual network basis is now presented. Heretofore, when configuring teams of NIC ports at the physical level, a primary port would be assigned through the configuration application 203 of FIG. 2. The user could do this manually through a GUI interfaced to the configuration application 203, or the configuration application 203 could make the choice in an automated fashion based on the teaming configuration. Such an automated decision could be based simply on choosing the MAC address of the first NIC in the team, or it could be based further on such criteria as the available throughput of the available NIC ports. As previously discussed, once the primary port (or in the case of an SLB team, the primary MAC address) is chosen, the choice is not altered when configuring virtual networks over the team. FIGS. 9A-C are procedural flow diagrams that illustrate an embodiment of a method of the invention for assigning primary ports and/or MAC addresses on a per virtual network basis. Those of skill in the art will appreciate that the method of the invention as illustrated can be adapted as part of, or as a replacement for, the configuration application 203 of FIG. 2.

With reference to FIG. 9A, processing begins at the Physical Team Primary Selection Process 900. This process is performed for each physical team of resources that has been configured, for example, by a user through a GUI interface to the configuration application. Process 900 is basically the same process by which a primary was assigned to a physical team as that performed by the configuration application 203, FIG. 2 of the prior art. The difference is that process 900 has a decision block 932 that calls a Set Primary per Configured VLAN process 950 whenever at least one virtual network has been configured. If the number of available NIC ports for a configured team is determined to be not greater than one at 902, and the link status for that port is determined to be not OK at 904, the team is failed at 906 and the process is terminated at exit block 908. If the link status is OK at 904, that port is set as the primary port at block 910 and the process is terminated at exit block 908 (if there is only one operating port for the team, it is the only one that can be designated as primary).

If it was determined at 902 that the number of available ports for the team is greater than one, processing proceeds to block 912 where the first available team port is selected. Processing proceeds through decision blocks 914, 916, 918, 920, 922 and 924 to determine the port's operational status. At 914, the port's link status is verified (i.e. does the port have physical link?). At 916, the port's transmit path status is determined (i.e. can it transmit a heartbeat frame successfully?). At 918, the port's receive path status is determined (i.e. can the port receive heartbeat frames from other team ports?). A degraded status (i.e. due to the fact that not all heartbeat frames are received) does not eliminate the port from use. At 920, if Active Path using VRRP/HSRP router frames is enabled for the team, the port's ability to receive those frames is ascertained. If this type of Active Path mechanism is not enabled for the team, this block is bypassed. Again, a degraded status (i.e. that ultimately this port and none of the other team ports can receive the frames) does not render the port unavailable for traffic duty. At 922, if Active Path using echo node frames is enabled for the team, the port's ability to receive those frames is ascertained. If this type of Active Path mechanism is not enabled for the team, this block is bypassed. Again, a degraded status (i.e. that ultimately this port and none of the other team ports can receive the frames) does not render the port unavailable for traffic duty. Finally, at 924, if Fast Path has been enabled for this particular team, the port's ability to receive Spanning Tree BDPU frames is ascertained. If the Fast Path mechanism is not enabled for the team, this block is bypassed. Again, a degraded status (i.e. that ultimately this port and none of the other team ports can receive the frames) does not render the port unavailable for traffic duty.

If the answer is "Yes" from all pertinent operational status checks for a given team port, the port is deemed OK to use for traffic and is a candidate for primary port of the team. Should it fail any of the status inquiries (i.e. a "No" response at any of the foregoing decision blocks), the port is eliminated as a choice for primary port at block 926, and it is determined if the last team port has been processed at decision block 928. If the answer is "No," the next port in the team is subjected to the same operational status inquiries as the previous port. This continues until it is determined at block 928 that all available team ports have been subjected to an operational status check (the answer at 928 is "Yes").

Processing then moves to decision block 932 to determine whether any VLANs have been configured, for example, by a user through a GUI coupled to the configuration application. If the answer is "No," processing proceeds to block 934 and the process becomes one which has been performed in the past when configuring teams at the physical level. At block 934, it is determined whether the user has specified any preferences as to which team port should be the primary. These preferences can also be specified through the GUI. If the user has specified a preference, the answer at 934 is "No" and processing continues at 942 where the port that is most preferred by the user, and which has passed all of the operational status checks previously described, is determined and that port is assigned as the primary port for the physical team at block 910. The process is then terminated for this team at exit block 908.

If the user has established no preference for the ports that have passed the operational status checks, it is determined at block 936 whether the port costs are equal for all operationally available ports of the team. If they are, the answer at 936 is "Yes" and the port selected to be the primary is simply that port with the lowest port ID at block 940. A port ID scheme can be simply a unique number starting at one and ending at the largest number of ports that can be configured for a team. This port is then assigned as the primary port for the physical team at block 910. The process is then terminated for this team at exit block 908. If the port costs are not determined to be equal at block 936 (port cost can be determined by the Fast Path mechanism, and/or based on the throughput of the port, for example), the port with the lowest cost is selected at 938. Any ties between ports can be broken by choosing the port with the lowest port ID. This port is then assigned as the primary port for the physical team at block 910. The process is then terminated for this team at exit block 908.

As previously mentioned, when the answer at decision block 932 is that there are no VLANs configured, this process is typical of the procedural flow for assigning primary ports to teams on the physical level in the past. Any VLANs that may have been configured by the user were constrained to use the team as physically configured, including the number of ports in the team, the team type and the primary selected for that team. In an embodiment of the present invention, VLANs are configured independently through the GUI by the user, where the team type, the number of ports in the team, advanced teaming mechanisms and port preferences can all be specified on a per virtual network basis. Thus, when the answer at 932 is "Yes" there are VLANs configured, once it is determined which team ports are operationally available as described above, processing continues by calling the Set Primary per Configured VLAN process 950.

An embodiment of the Set Primary per Configured VLAN process 950 is illustrated in FIG. 9B. Processing starts by selecting a configured VLAN for processing. This can be done, for example, based on a VLAN ID such as VLAN01, VLAN02 ... etc. First, it is determined at block 954 whether user preference is equal on all ports configured for that VLAN. If the answer is "No," processing continues at block 956 where the port with greatest user preference is selected (ties can be broken based on lowest port ID) and designated as the primary port for the VLAN at 958. If this was the last configured VLAN to be processed, then the answer at decision block 960 is "Yes" and the process is terminated at exit block 962. If there are other configured VLANs that require a primary port assignment, the answer at 960 is "No" and processing returns back to block 952 where the next configured VLAN is selected for processing.

If the answer at 954 is "Yes" that user preference is equal on all ports, processing continues at block 964 where it is determined if the number of configured VLANs is greater than one. If the answer is "No" then processing continues at 966 where it is determined if port costs are equal for all of the team ports configured for the VLAN. If the answer is "Yes" then the operationally available port with the lowest port ID is selected at 968 and assigned as primary port for the VLAN at block 958. Because this is the only configured VLAN as determined at block at 964, the answer at block 960 is "Yes" and the process is terminated at exit block 962. If the answer at block 964 is "Yes," processing continues by calling the Choose Primary for Optimal Traffic Balance process 980.

For the foregoing discussions, there has been no detail regarding how the primary layer2 addresses are chosen for each of the configured VLANs. Those of skill in the art will appreciate that there are many ways in which such a selection process may be implemented. For example, in an embodiment the port selection process could be as simple as assigning primary ports based on some simple algorithm which groups ports together that are shared by configured VLANs as logical teams. Thus, the NFT team of FIGS. 3C and 3D, and the TLB team of FIGS. 4C and 4D for example, can be thought of essentially as a logical NFT or TLB team (respectively) over which the VLANs are configured. The algorithm uses the VLAN ID numbers and port ID numbers in a round-robin fashion to assign the ports as primary ports for each VLAN sharing the ports of that logical team. For example, if there are two ports that are assigned to all of a set of configured VLANs (e.g. VLAN2 and VLAN4), the first shared port listed would be assigned as primary for the VLAN having the lowest ID (i.e. VLAN2). The second shared port listed would be assigned as primary for the VLAN having the next highest ID or VLAN 4. If a third VLAN, (e.g. VLAN10), was added that uses both ports of the logical team, the primary port assigned would be the first port again. Thus, port 1 is now assigned to VLANs 2, 10, and port 2 is assigned as primary for VLAN4. This is algorithm would therefore achieve the primary port assignments as illustrated in FIGS. 3C and 3D as well as FIGS. 4C and 4D.

If a fourth and fifth VLAN were added that also both share the two ports of the logical team, but the IDs of which fall between those of the other configured VLANS, such as VLAN3 and VLAN8, the list would be reconfigured as follows: port 1 is assigned as primary for VLANs 2, 4, 10 while port 2 is assigned as primary for VLANs 3, 8. If a third port is added to the set of ports shared by the VLANs as a logical team, the list would be again reconfigured as follows: port 1 assigned as primary for VLANs 2, 8; and port 2 assigned as primary for VLANs 3, 10; and port 3 assigned as primary for VLAN 4. This scheme is one example of how traffic could be roughly balanced through a distribution of primary port assignments.

Another even simpler technique would be to employ an "even-odd" mode, wherein the odd numbered ports of a shared logical team would be assigned as primary for all VLANs having odd-numbered IDs. The even numbered ports of the logical team would be assigned as the primary port for all of the even-numbered VLANs configured using the ports of the logical team. This algorithm would also achieve the primary port assignments as illustrated in FIGS. 3C and 3D as well as FIGS. 4C and 4D.

Of course, neither of the foregoing embodiments of primary port assignment processes takes variations in available throughput that may exist among the available ports. One simple way to handle that is to permit the user to manually establish preferences for primary ports based on available throughput of the available ports as well as known or anticipated traffic demand for each of the VLANs to be configured over a logical team of ports. For example, if a user has three VLANS (3, 5, 8) configured over a logical NFT team of two (2) Gigabit ports, and the user knows or can predict that VLAN 3 is or will be 50% of the traffic, VLAN 5 is or will be 30%, and VLAN 8 is or will be 20%, a manual configuration through the GUI could be used to achieve improved load balancing. Using the automatic configuration based on the first algorithm described above, the primary port assignments for each VLANs would be: port 1 assigned as primary for VLAN 3, 8 and thus handling 70% of the traffic flow; port 2 assigned as primary for VLAN 5 and handling 30% of the traffic. Using a manual mode, a user would be able to configure the VLANs like this: port 1 assigned as primary for VLAN 3 and handling 50% of the traffic; port 2 assigned as primary for VLANs 5, 8 and handling 50% of the traffic.

FIG. 9C illustrates an embodiment of a process by which primary ports can be selected for each configured VLAN based on how the ports are being used by the other configured VLANs and the overall traffic throughput capabilities of each of the ports. Processing starts at block 982 where a port rating is established for each operationally available port that is to be used by the configured VLAN being processed. In an embodiment, a port rating can be determined as one point for each 1 Mbps of traffic throughput capacity. Processing then proceeds to block 984 where it is determined if any of the operationally available ports used by the configured VLAN being processed are already being used as transmit only ports (such as for a TLB team) by previously processed VLANs. If the answer is Yes, then the port rating for each of those transmit only ports is reduced at block 986 by 10% times the number of VLANs for which it is acting in that capacity already.

Processing then proceeds to block 988 where it is determined if any of the operationally available ports to be used by the configured VLAN currently being processed are already being used as both transmit and receive ports (such as for a dual channel team or a channel based TLB team) by previously processed VLANs. If the answer is Yes, then the port rating is reduced at block 990 for each of those transmit/receive ports is reduced by 30% times the number of VLANs for which it is already acting in that capacity.

Processing then proceeds to block 992 where it is determined if any of the operationally available ports to be used by the configured VLAN currently being processed are already being used as standby ports (such as for an NFT team) by previously processed VLANs. If the answer is Yes, then the port rating for each of those standby ports is reduced at block 994 by 5% times the number of VLANs for which it is already acting in that capacity.

Processing proceeds to block 996 where it is determined if there is more than one port with the best port rating. If the answer is "No" that port is selected at block 998 and processing returns at block 958, FIG. 9B. At that time, the selected port is assigned as primary for the VLAN and processing proceeds at 960 as previously described. If the answer is "Yes" at 996, the tie is broken using the lowest port ID of the ports tied with the best port rating. That port is then selected at block 998 and processing returns at block 958, FIG. 9B. At that point, the selected port is assigned as primary for the VLAN and processing proceeds at 960 as previously described. Processing continues as previously described until all configured VLANs have been assigned a primary port and the answer at 960 is "Yes" once again.

Those of skill in the art will recognize that even more complex traffic balancing algorithms can be implemented without exceeding the intended scope of the invention. For example, the algorithm could even monitor actual traffic flow and reassign primary ports based on real-time changes in the behavior of the network.

FIG. 10 is a conceptual representation of a more complex example of a system for teaming network resources on a per virtual network basis 1000. In this example, there are six NICs N1 1060, N2 1062, N3 1064, N4 1066, N5 1068 and N6 1070. Ports 1090 and 1092 of NICs N5 1068 and N6 1070 are configured as an aggregation group through a switch (not shown) that provides a port aggregation group Agg4 1016. Ports 1086 and 1088 of NICs N3 1064 and N4 1066 are also configured as an aggregation group through a switch (not shown) that provides a port aggregation group Agg3 1014. The ports 1082 and 1084 of NICs N1 1060 and N2 1062 respectively are represented as single port aggregation groups 1010 and 1012 (and thus are not actually port trunked). Thus, the aggregation groups Agg3 1014 and Agg4 1016 provide a single aggregated port for purposes of assigning primary ports as previously described.

As indicated, VLAN2 1008b is a TLB team and achieves that as a channel based TLB team. Port trunk 1014 is assigned as the primary MAC address for the channel based TLB team of VLAN2 1008b and ports 1082 and 1084 of NICs N1 1060 and N2 1062 are the transmit-only ports for the team. As indicated, VLAN3 1008c is a fully load balanced team, through use of a dual channel with ARP intercept team type. Port trunk 1016 is assigned as one of the primary MAC addresses for the dual channel with ARP intercept team of VLAN3 1008c. Port trunk 1014 is assigned as the second possible MAC address for the dual channel team of VLAN3 1008c. VLAN1 1008a is a simple NFT team that has been assigned single port aggregation group Agg1 1010 (which is essentially port 1082 of NIC N1 1060) as its primary port, and uses single port aggregation group Agg2 1012 (which is essentially port 1084 of NIC N2 1062). While it may seem superfluous to include single port aggregation groups when no actual port aggregation is required, the aggregation group level is provided to simplify the representation of all ports at that level consistently before the assignment of primary ports to the VLANs. Representing all ports as aggregation groups at this level, whether they be single or multiple port groups, simplifies the graphical representation of this level for a user as can be seen in FIG. 10C, which is a screen shot of a GUI representing the configuration of FIG. 10A.

The NFT team of VLAN1 1008a has also been configured to use Fast Path, and both forms of Active Path (echo node and router frames). The NFT team of VLAN1 1008a will also use Fast Path to monitor for a Split LAN condition. The channel-based TLB team of VLAN2 1008b has been configured to use Fast Path and a particular transmit load balancing algorithm that is executed on behalf of the VLAN2 1008b team by the teaming driver. The dual channel team with ARP intercept team of VLAN3 1008c has also been configured to use Active Path (echo node), Fast Path and a transmit load balancing algorithm executed on behalf of the VLAN team by the teaming driver. All teams use heartbeats to monitor the transmit and receive paths of the ports.

Figure 10A:
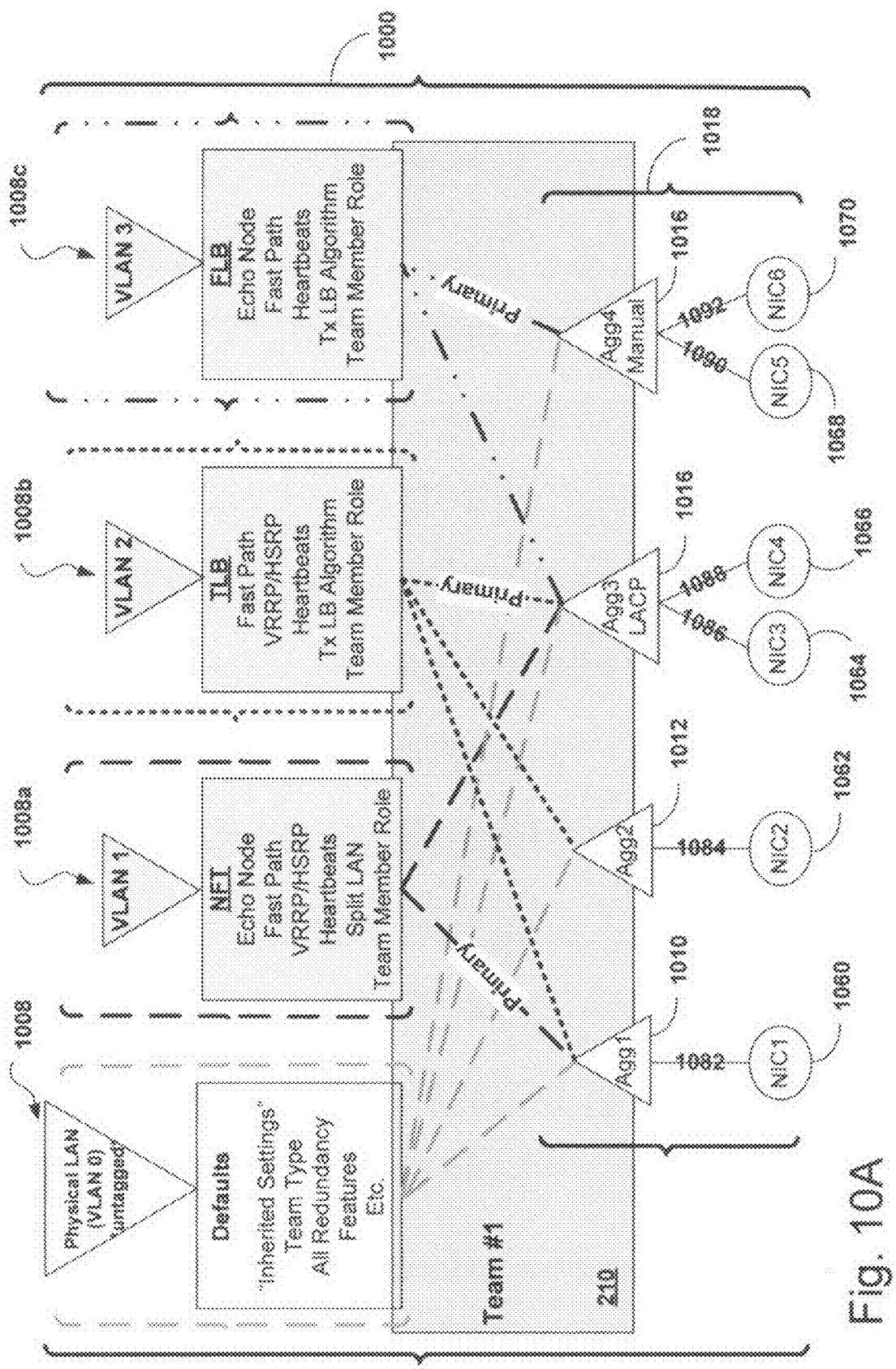
FIG. 10A is a conceptual block diagram illustrating three VLANs each independently configured at the virtual network level by which available network resources are assigned thereto on a per VLAN basis in accordance with embodiments of the invention.
Figure 10B:
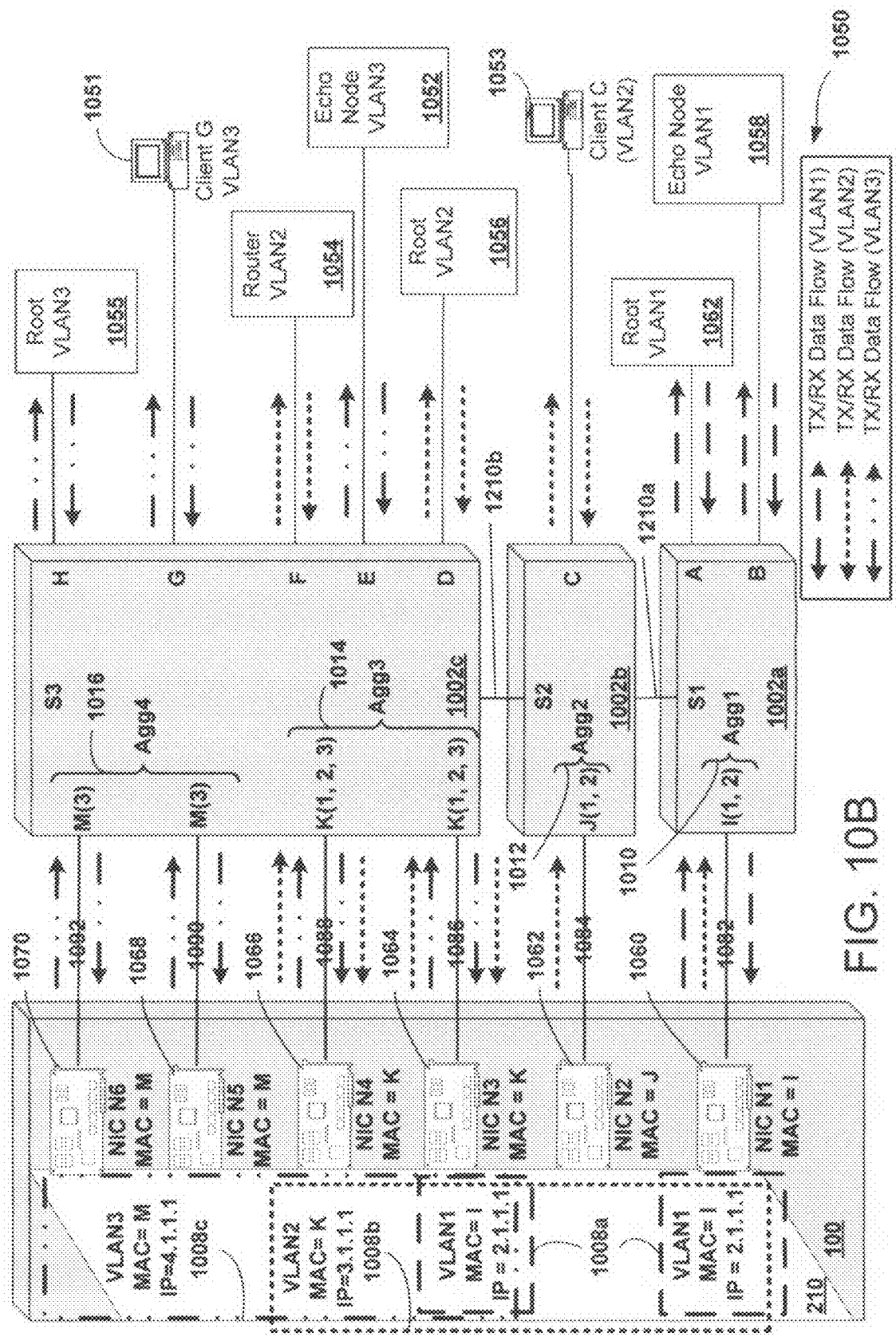
FIG. 10B is a block diagram illustrating the traffic flow over a network for the three VLANs of FIG. 10A, each independently configured at the virtual network level by which available network resources are assigned thereto on a per VLAN basis in accordance with embodiments of the invention.
Figure 10C:
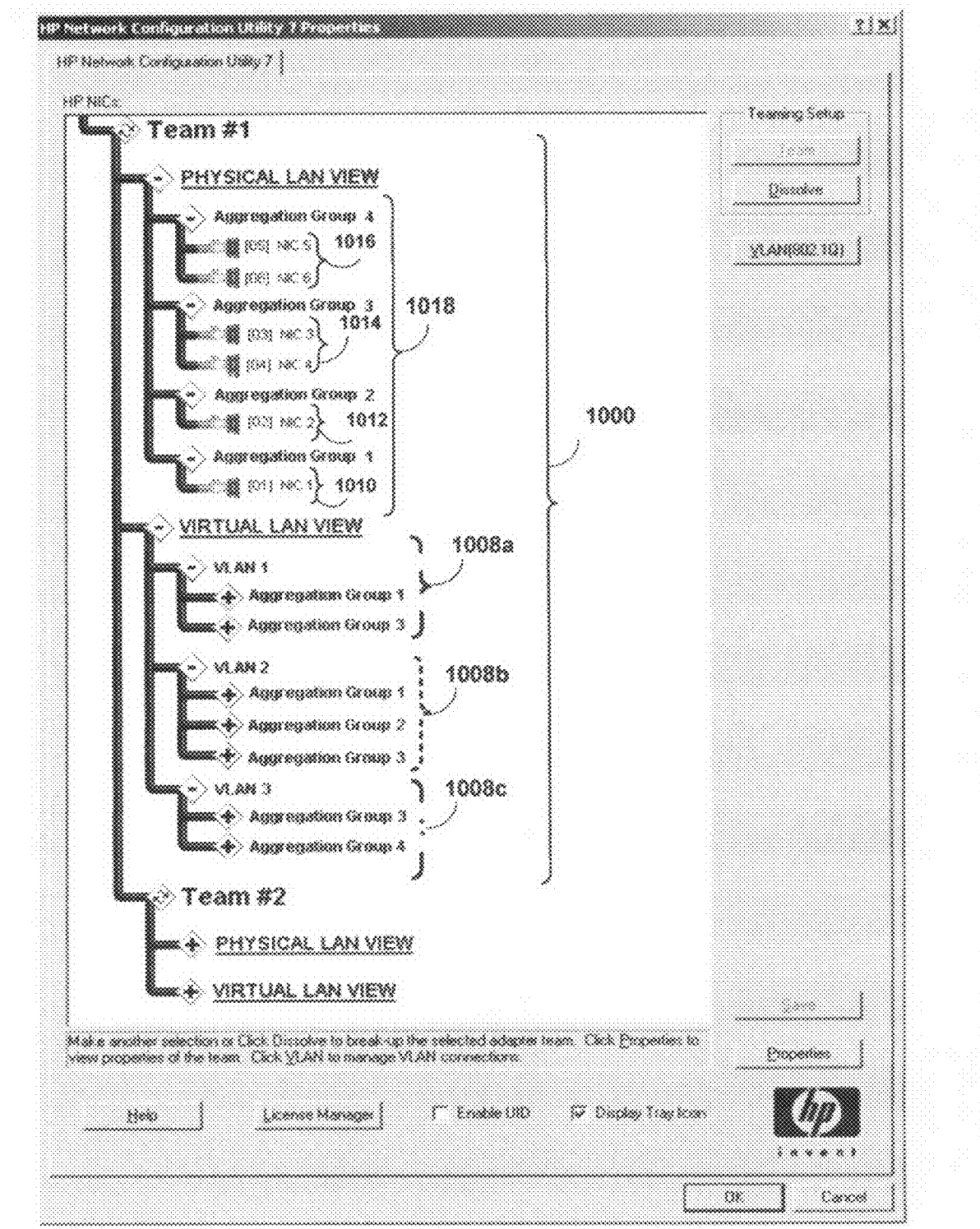
FIG. 10C is a screenshot diagram illustrating a GUI representation of the three VLANs of FIGS. 10A and 10B that have been configured using the GUI to team the available resources on a per VLAN basis in accordance with an embodiment of the invention.

FIG. 10B illustrates a more topological representation of the teaming configuration of FIG. 10A. Switch S3 1002c provides the port trunking required to create aggregation groups Agg3 1014 and Agg4 1016. It should be noted that the two port trunks 1014 and 1016 can be created with two different switches rather than a single switch, and can be created using two different port trunking algorithms notwithstanding they are created using the same switch. These two port trunks provide the primary MAC addresses for VLAN2 1008b and VLAN3 1008c respectively as illustrated. The dual channel with ARP intercept team of VLAN3 1008c provides full load-balancing (FLB) for transmit and receive traffic over the two port trunks, the team MAC address alternating between MAC=M and MAC=K, as was the case for the dual channel team of VLAN1 708a of FIG. 7B. It will be appreciated by those of skill in the art that any assignment of port trunk 1016 as a "primary port" is really merely an assignment of an initial MAC address for a dual channel team with ARP intercept. There are really no primary ports when it comes to fully load-balanced teams as all ports of the team are both transmitting and receiving. The switch ports of switch S3 have been associated with VLAN3 1008c as illustrated.

Port trunk 1014 (Agg3) is assigned as the primary port for the channel-based TLB team of VLAN2 1008b. Thus, the MAC address for the team for members of VLAN2 1008b will be MAC=K. Single port trunks 1010 (Agg1) and 1012 (Agg2) are used by the VLAN2 team as transmit only ports as illustrated. Switches S1 1002a, S2 1002b and S3 1002c are programmed to associate their appropriate switch ports with VLAN2 1008b as illustrated.

Single port trunk 1010 (Agg1) is assigned as the primary port for VLAN1 1008a and thus the team MAC address (i.e. the address by which the tean is identified) to members of VLAN1 1008a is MAC=I. Port trunk 1014 (Agg3) acts as a standby port for purposes of fault tolerance as illustrated. The switch ports of switches S1 1002a and S3 1002c have been programmed to associate VLAN1 with the appropriate switch ports coupled to these port trunks as illustrated.

As illustrated, it can be appreciated that much more flexible teaming of resources can be accomplished when teaming the resources on a per virtual network basis. In addition to the ability to use the resources in very different ways for each VLAN as far as team type is concerned, and the ability to distribute the traffic more evenly over the resources, the advanced teaming techniques can be more successfully employed for each VLAN. As can be seen from the example, if all VLANs were constrained to use port trunk 1016 (Agg4) as the primary port, Fast Path could not be employed for the VLAN1 1008a in this example.

FIG. 10C illustrates a screen shot for an embodiment of a GUI by which as user can specify a hierarchy for each team of resources 1000 on a per virtual network basis. At the top of the hierarchy is the physical view 1018 of the team of resources, including the NICs N1 1060, N2 1062, N3 1064, N4 1066, N5 1068 and N6 1070 and the aggregation groups Agg1 1010, Agg2 1012, Agg3 1014 and Agg4 1016 into which they are grouped for the example of FIGS. 10A and 10C. VLANs are then configured in a second hierarchy by which the aggregation groups are assigned as illustrated by VLAN1 1008a, VLAN2 1008b and VLAN3 1008c.

What is claimed is:

1. A method comprising:
configuring a first virtual network with a first layer3 address, the first virtual network operates a plurality of network resource ports as a first team;
configuring a second virtual network with a second layer3 address, the second virtual network operates the plurality of network resource ports as a second team, the second virtual network distinct from the first virtual network and the second layer3 address distinct from the first layer3 address;
selecting a first layer2 address that is uniquely associated with a first network resource port of the plurality of network resource ports;
selecting a second layer2 address that is uniquely associated a second network resource port of the plurality of network resource ports, the second layer2 address distinct from the first layer2 address;
assigning the first layer2 address to be a primary layer2 address for the first virtual network; and
assigning the second layer2 address to be a primary layer2 address for the second virtual network.

2. The method of claim 1 further comprising receiving data traffic transmitted by clients associated with each of the virtual networks, the data received from the associated clients being addressed to the primary layer2 address established for the virtual network with which the clients are associated.

3. The method of claim 1 further comprising enabling one or more advanced teaming techniques for each of the configured virtual networks.

4. The method of claim 3 wherein one of the enabled advanced teaming techniques is fast path.

5. The method of claim 3 wherein one of the enabled advanced teaming techniques is active path.

6. The method of claim 3 wherein one of the enabled advanced teaming techniques is monitoring for a split LAN (local area network) condition.

7. The method of claim 1 wherein said selecting the first layer2 address and selecting the second layer2 address is performed in a manner that more evenly balances data traffic transmitted and received by the plurality of network resource ports.

8. The method of claim 1 wherein the first team and the second team are NFT (network fault tolerance) teams.

9. The method of claim 1 wherein the first team and the second team are TLB (transmit load-balanced) teams.

10. The method of claim 1 wherein the first team and the second team are dual channel teams.

11. The method of claim 1 wherein the first team and the second team are a channel based transmit load-balanced (TLB) type.

12. A method of teaming a plurality of network resource ports of a computer system on a per virtual network basis comprising:
configuring one or more virtual networks; and
for each of the one or more configured virtual networks:
establishing a team comprising two or more of the network resource ports;
selecting a layer2 address that is uniquely associated with one of the ports of the team; and
assigning the selected unique layer2 address to be a primary layer2 address for the team;
wherein said selecting a layer2 address comprises:
identifying each of the network resource ports with a unique port ID and each of the configured virtual networks with a unique virtual network ID;
grouping the plurality of network resource ports into logical teams, each of the logical teams being used by one or more of the configured virtual networks; and
for each of the logical teams, assigning one of the layer2 addresses uniquely associated with each of the logical team ports to each of the configured virtual networks using the logical team, said assigning starting with the layer2 address of the logical team port identified by a lowest port ID and the virtual network identified by a lowest virtual network ID, and continuing with a next highest logical team port and a next highest virtual network ID until all of the virtual networks have been assigned a layer2 address, said assigning starting over at the lowest port ID if the number of virtual networks using the virtual team is greater than the number of logical team ports.

13. The method of claim 12 wherein if one or more additional virtual networks are configured to use a virtual team after said assigning is initially performed:
identifying each of the one or more additional configured virtual networks with a unique virtual network ID; and
re-performing said assigning.

14. The method of claim 12 wherein layer2 addresses associated with ports identified by odd-numbered port IDs are assigned to virtual networks identified by odd-numbered virtual network IDs, and layer2 addresses associated with ports identified by even-numbered port IDs are assigned to virtual networks identified by even-numbered virtual network IDs.

15. A method of teaming a plurality of network resource ports of a computer system on a per virtual network basis comprising:

configuring one or more virtual networks; and for each of the one or more configured virtual networks:

establishing a team comprising two or more of the network resource ports;

selecting a layer2 address that is uniquely associated with one of the ports of the team; and assigning the selected unique layer2 address to be a primary layer2 address for the team;

wherein said selecting a layer2 address comprises, for each established team:

determining an initial rating for each port of the established team currently being processed based on throughput capability of the port;

determining a final rating for each port by subtracting from the determined initial rating for each port a value that is based on how the port is already being used to handle data traffic for other established teams for which layer2 addresses have been previously assigned; and selecting the layer2 address associated with the port of the established team currently being processed having a best determined final rating.

16. The method of claim 15 wherein said determining a final rating further comprises:

for each port:

subtracting from the port's initial rating a first percentage if the port is already being used as a transmit only port;

subtracting from the port's initial rating a second percentage if the port is already being used as a transmit and a receive port; and subtracting from the port's initial rating a third percentage if the port is already being used as a standby only port.

17. The method of claim 15 wherein each of the ports are initially assigned a port cost, said selecting a layer2 address further comprising:

if the port cost value for one of the ports of the established team currently being processed is lower than all of the other ports of the team, selecting the layer2 address associated with the one of the ports having the lowest cost;

if the port cost values for two or more of the ports of the established team currently being processed is lower than other ports of the team, performing said determining a final rating on the two or more ports; and if the port costs values of all of the ports of the established team currently being processed are equal, then performing said determining a final rating on all of the ports of the team.

18. A computer system for teaming a plurality of its network resource ports on a per virtual network basis, the computer system configured to:

configure one or more virtual networks; and establish a team for each of the one or more configured virtual networks, each established team comprising two or more of the network resource ports;

select a layer2 address that is uniquely associated with one of the ports of the team; and assign the selected unique layer2 address to be a primary layer2 address for the established team;

wherein, the computer system is further configured, as part of selection of a layer2 address, to:

determine, for each established team, an initial rating for each port of an established team currently being processed based on throughput capability of the port;

determine, for each established team, a final rating for each port by subtracting from the determined initial rating for each a port a value that is based on how the port is already being used to handle data traffic for other established teams for which layer2 addresses have been previously assigned; and select the layer2 address associated with the port of the established team currently being processed having a best determined final rating.

19. The computer system of claim 18, further configured, as part of determination of a final rating for each port, to:

subtract from the port's initial rating a first percentage if the port is already being used as a transmit only port;

subtract from the port's initial rating a second percentage if the port is already being used as a transmit and a receive port; and subtract from the port's initial rating a third percentage if the port is already being used as a standby only port.

20. The computer system of claim 19 wherein each of the ports are initially assigned a port cost, and the computer system is configured, as part of selection of a layer2 address, to:

select the layer2 address associated with one of the ports having the lowest cost if the port cost value for the one of the ports of the established team currently being processed is lower than all of the other ports of the team;

determine a final rating on two or more ports if the port cost values for the two or more of the ports of the established team currently being processed is lower than other ports of the team; and determine a final rating on all of the ports of the team if the port costs values of all of the ports of the established team currently being processed are equal.

* * * * *